(12) United States Patent
Leonard et al.

(10) Patent No.: US 7,717,495 B2
(45) Date of Patent: May 18, 2010

(54) VEHICLE WITH SPACE UTILIZATION

(75) Inventors: Joshua J. Leonard, North Branch, MN (US); Richard Raymond Maki, North Branch, MN (US); Eric Bjerketvedt, North Branch, MN (US); Michael D Schneider, Dalbo, MN (US); Bradley Robert Morisch, Lindstrom, MN (US); Brian D Krosschell, Chisago City, MN (US); Louis J Brady, Wyoming, MN (US); James Bergman, Oslo, MN (US); Larry Holter, Alvarado, MN (US); Richard Nelson, Oslo, MN (US); Lionel Hoff, Oslo, MN (US); Doug Moman, Warren, MN (US); Lyle R. Georges, Loretto, MN (US)

(73) Assignee: Polaris Industries, Inc., Medina, MN (US)

( * ) Notice: Subject to any disclaimer, the term of this patent is extended or adjusted under 35 U.S.C. 154(b) by 8 days.

(21) Appl. No.: 12/050,064

(22) Filed: Mar. 17, 2008

(65) Prior Publication Data

US 2009/0121518 A1    May 14, 2009

Related U.S. Application Data

(60) Provisional application No. 60/918,444, filed on Mar. 16, 2007.

(51) Int. Cl.
*B62D 33/00*    (2006.01)
(52) U.S. Cl. .................................. 296/183.1; 180/311

(58) Field of Classification Search .............. 296/183.1, 296/37.8; 180/311
See application file for complete search history.

(56) References Cited

U.S. PATENT DOCUMENTS

| 2,672,103 | A | 3/1954 | Hohmes |
| 3,858,902 | A | 1/1975 | Howells et al. |
| 4,027,892 | A | 6/1977 | Parks |
| 4,098,414 | A | 7/1978 | Abiera |
| 4,561,323 | A | 12/1985 | Stromberg |
| 4,821,825 | A | 4/1989 | Somerton-Rayner |
| 4,934,737 | A | 6/1990 | Nakatsuka |
| 5,036,939 | A | 8/1991 | Johnson et al. |
| 5,251,713 | A | 10/1993 | Enokimoto |
| 5,863,277 | A | 1/1999 | Melbourne |
| 5,950,750 | A | 9/1999 | Dong et al. |
| 6,092,877 | A | 7/2000 | Rasidescu et al. |

(Continued)

FOREIGN PATENT DOCUMENTS

CH    317 335 A    11/1956

(Continued)

OTHER PUBLICATIONS

International Search Report and Written Opinion for PCT/US2008/003485 issued by the European Patent Office on Aug. 27, 2008.

(Continued)

*Primary Examiner*—Lori L Lyjak
(74) *Attorney, Agent, or Firm*—Baker & Daniels LLP

(57) ABSTRACT

A utility vehicle with space utilization features is disclosed. The space utilization features provide storage and access to components.

27 Claims, 24 Drawing Sheets

U.S. PATENT DOCUMENTS

| | | | |
|---|---|---|---|
| 6,149,540 | A | 11/2000 | Johnson et al. |
| 6,199,894 | B1 | 3/2001 | Anderson |
| 6,467,787 | B1 | 10/2002 | Marsh |
| 6,622,968 | B1 | 9/2003 | St. Clair et al. |
| 6,695,566 | B2 | 2/2004 | Navio |
| 6,725,962 | B1 | 4/2004 | Fukuda |
| 6,752,235 | B1 | 6/2004 | Bell et al. |
| 6,786,526 | B1 * | 9/2004 | Blalock ............ 296/77.1 |
| 6,799,779 | B2 | 10/2004 | Shibayama |
| 6,799,781 | B2 | 10/2004 | Rasidescu et al. |
| 6,916,142 | B2 | 7/2005 | Hansen et al. |
| 6,923,507 | B1 | 8/2005 | Billberg et al. |
| 6,978,857 | B2 | 12/2005 | Korenjak |
| 7,055,454 | B1 | 6/2006 | Whiting et al. |
| 7,124,853 | B1 | 10/2006 | Kole, Jr. |
| 7,125,134 | B1 | 10/2006 | Hedlund et al. |
| 7,237,789 | B1 | 7/2007 | Herman |
| 7,239,032 | B1 | 7/2007 | Wilson et al. |
| 7,431,024 | B2 | 10/2008 | Buchwitz et al. |
| 2002/0147072 | A1 | 10/2002 | Goodell et al. |
| 2002/0178968 | A1 | 12/2002 | Christensen |
| 2003/0001409 | A1 | 1/2003 | Semple et al. |
| 2004/0079561 | A1 | 4/2004 | Ozawa et al. |
| 2004/0108159 | A1 * | 6/2004 | Rondeau et al. ............ 180/311 |
| 2004/0195797 | A1 | 10/2004 | Nash et al. |
| 2005/0173177 | A1 | 8/2005 | Smith et al. |
| 2005/0173180 | A1 | 8/2005 | Hypes et al. |
| 2005/0248116 | A1 | 11/2005 | Fanson |
| 2008/0023240 | A1 | 1/2008 | Sunsdahl et al. |
| 2008/0023249 | A1 | 1/2008 | Sunsdahl et al. |

FOREIGN PATENT DOCUMENTS

| | | |
|---|---|---|
| DE | 116 605 C | 2/1900 |
| DE | 17 55 101 A1 | 4/1971 |
| DE | 30 33 707 A1 | 4/1982 |
| EP | 0238077 A | 9/1987 |
| EP | 0 709 247 A | 5/1996 |
| EP | 0794096 A | 9/1997 |
| EP | 1 215 107 A | 6/2002 |
| EP | 1557345 A | 7/2005 |
| EP | 1 564 123 A | 8/2005 |
| JP | 11 334447 A | 12/1999 |
| JP | 2000 177434 A | 6/2000 |

OTHER PUBLICATIONS

International Search Report and Written Opinion for PCT/US2008/003480 issued by the European Patent Office on Sep. 1, 2008.
International Search Report and Written Opinion for PCT/US2008/003483 issued by the European Patent Office on Oct. 2, 2008.

* cited by examiner

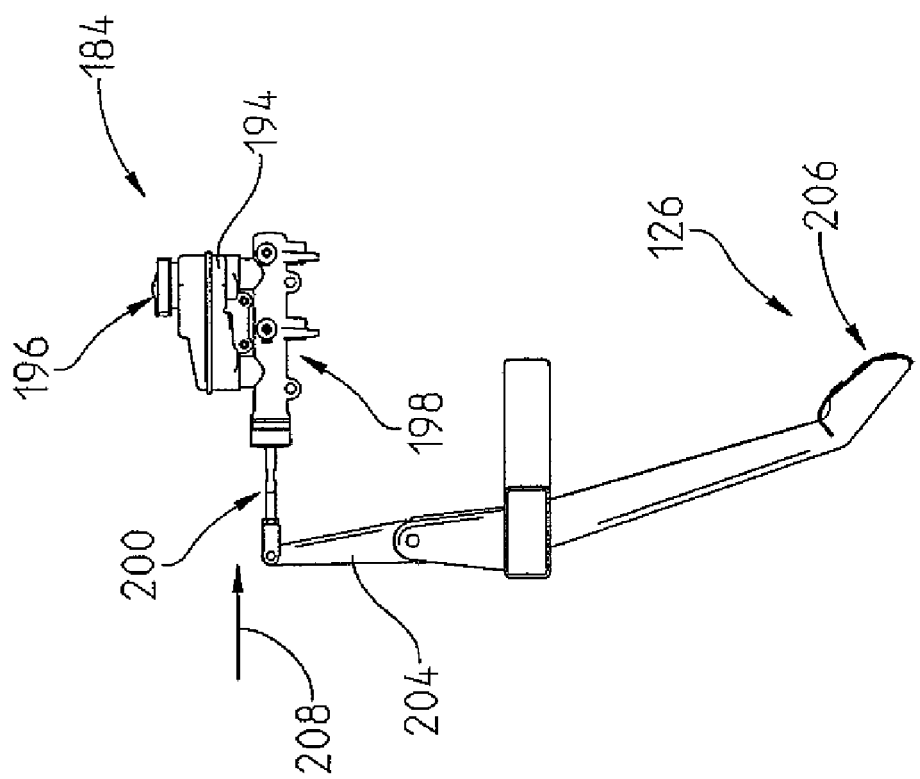
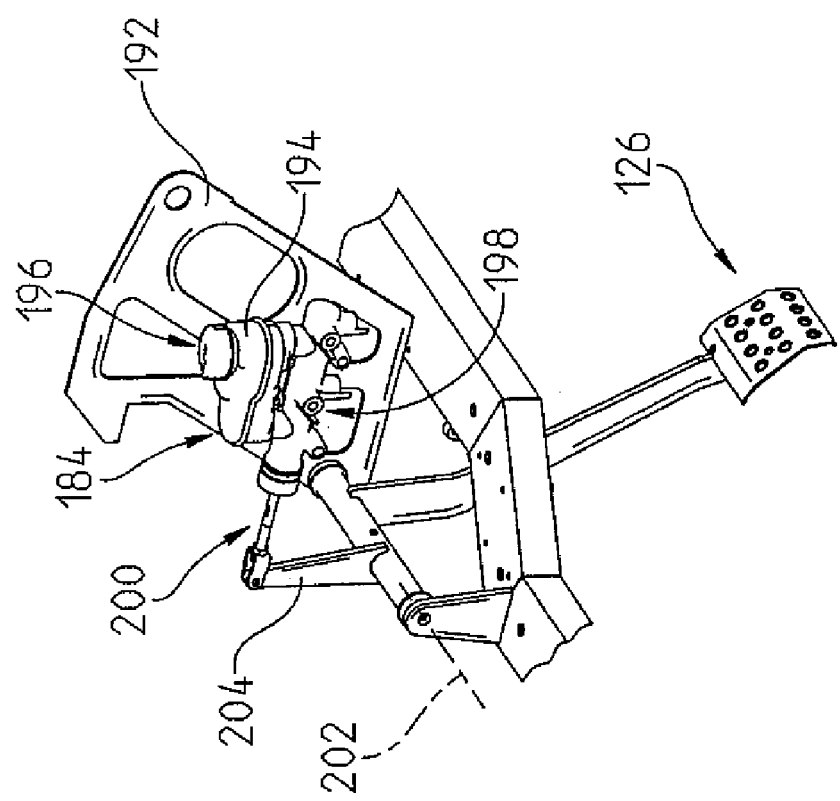
FIG. 12
FIG. 11

VEHICLE WITH SPACE UTILIZATION

CROSS-REFERENCE TO RELATED APPLICATIONS

The present application claims the benefit of U.S. Provisional Application Ser. No. 60/918,444, filed Mar. 16, 2007 titled "VEHICLE WITH SPACE UTILIZATION", the disclosure of which is expressly incorporated by reference herein.

The disclosures of U.S. Provisional Application Ser. No. 60/918,502 filed Mar. 16, 2007, titled "VEHICLE", U.S. Provisional Application Ser. No. 60/918,556, filed Mar. 16, 2007, titled "VEHICLE", U.S. Provisional Application Ser. No. 60/918,356 filed Mar. 16, 2007, titled "UTILITY VEHICLE HAVING MODULAR COMPONENTS", and U.S. Provisional Application Ser. No. 60/918,500, filed Mar. 16, 2007, titled "METHOD AND APPARATUS RELATED TO TRANSPORTABILITY OF A VEHICLE", are expressly incorporated by reference herein.

STATEMENT REGARDING FEDERALLY SPONSORED RESEARCH OR DEVELOPMENT

Portions of this application may be subject to the terms of contract number H92222-06-C-0039 with the United States Special Operations Command (SOCOM).

FIELD OF THE INVENTION

The present invention relates generally to a vehicle and in particular to a utility vehicle with space utilization features for storage, component access, and for other reasons.

BACKGROUND OF THE INVENTION

Vehicles including utility vehicles, all-terrain vehicles, tractors, and others are known. It is known to provide a vehicle with a hitch and to attach sub-assemblies having axles to the hitch in a pivotal manner. Sub-assemblies generally include trailers. The vehicle's hitch powers such sub-assemblies. The hitch is configured to allow sub-assemblies to pivot vertically or horizontally or both about the hitch. It is also known to provide a vehicle with a cargo bed and with platforms covered by roofs or hoods.

SUMMARY OF THE INVENTION

Multiple embodiments are disclosed herein which display a utility vehicle with space utilization features. The utility vehicle has a main frame supported by a plurality of ground engaging members, an engine, an operator area, a dashboard, and a cargo platform. The cargo platform is normally exposed and is located forward of the dashboard and at least partially between the front ground engaging members.

In still another embodiment, the vehicle has at least three spaced-apart main couplings and a detachable subsection. The detachable subsection has a subframe including a plurality of frame members cooperating to define an interior storage region. The subsection also has at least two ground engagement members and at least three subsection front couplings. The subsection front couplings are adapted to detachably couple the subsection to the main couplings of the main frame. The subsection front couplings are spaced apart to substantially prevent the modular subsection from pivoting relative to the main frame when the modular subsection is coupled to the main frame.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 11 is a perspective view of portions of a brake system of the vehicle of FIG. 1;

FIG. 12 is a side elevation view of portions of the brake system shown in FIG. 11;

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Figure 1:
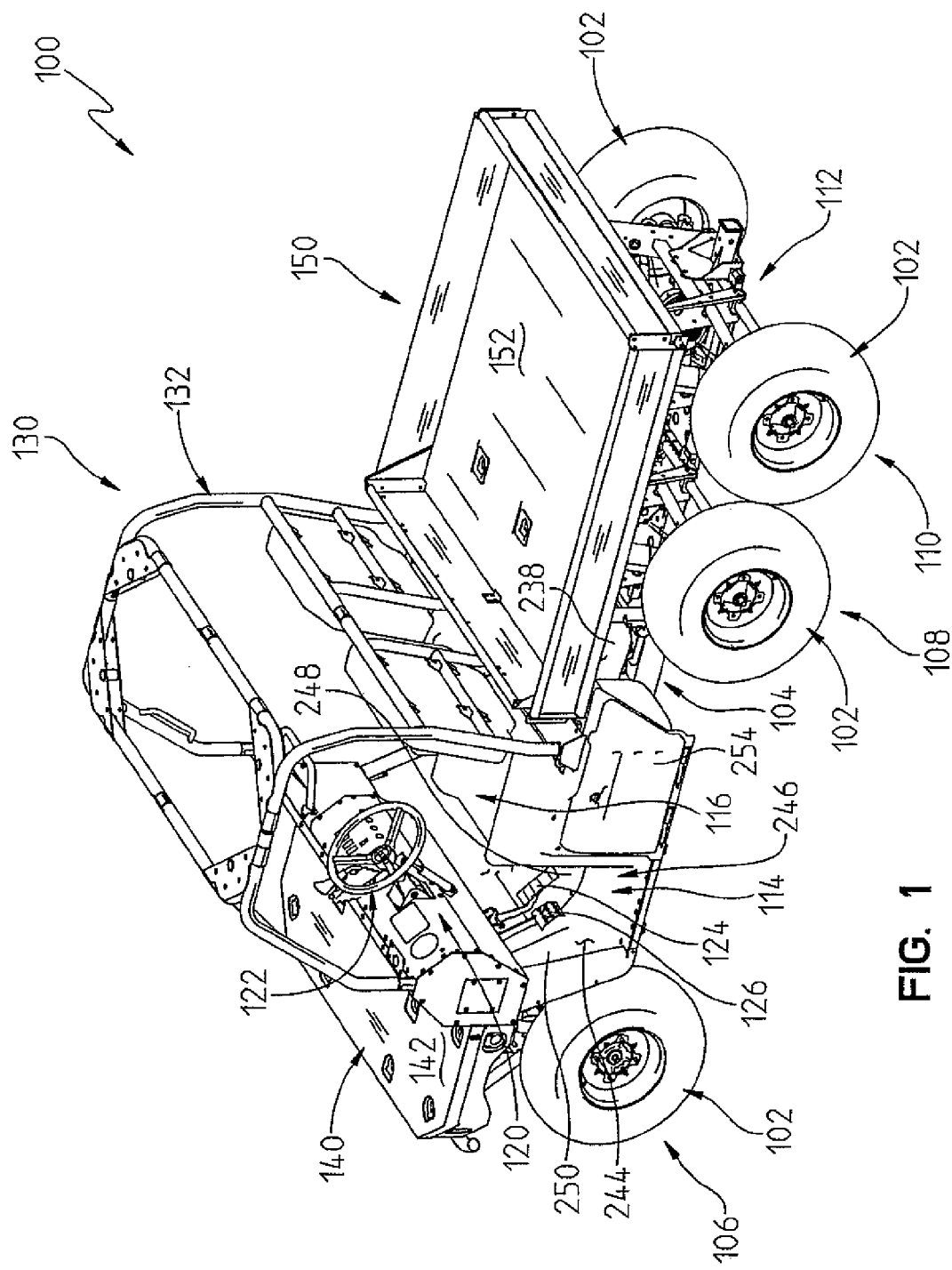
FIG. 1 is a rear, perspective view of a vehicle from a first side of the vehicle, the vehicle including a front platform and a rear platform.

Referring to FIG. 1, an illustrative embodiment of a vehicle 100 is shown. Vehicle 100 as illustrated includes a plurality of ground engaging members 102, illustratively wheels. A first set of wheels, one on each side of vehicle 100, generally correspond to a front axle 106. A second set of wheels, one on each side of vehicle 100, generally correspond to a middle axle 108. A third set of wheels, one on each side of vehicle 100, generally correspond to a rear axle 110.

In one embodiment, one or more of the wheels may be replaced with tracks, such as the Prospector II Tracks available from Polaris Industries, Inc. located at 2100 Highway 55 in Medina, Minn. 55340. In one embodiment, a track is placed around the tires of the wheels middle axle 108 and rear axle 110 on each side of vehicle 100.

Vehicle 100 further includes a frame 104 supported by the plurality of ground engaging members 102. As explained in more detail in U.S. Provisional Application Ser. No. 60/918,502 filed Mar. 16, 2007, titled "VEHICLE", frame 104 may include a modular subsection 112 which is supported by rear axle 110. Modular subsection 112 may be removed from the remainder of vehicle 100 to convert vehicle 100 from a six-wheeled vehicle to a four-wheeled vehicle. Further, additional modular subsections 112 may be added to vehicle 100 to convert vehicle 100 from a six-wheeled vehicle to an eight-wheeled vehicle or more.

Vehicle 100 includes an operator area 114 which includes seating 116 for one or more passengers. Operator area 114 further includes a plurality of operator controls 120 by which an operator may provide input into the control of vehicle 100. Controls 120 include a steering wheel 122 which is rotated by the operator to change the orientation of one or more of ground engaging members 102, such as the wheels associated with front axle 106, to steer vehicle 100.

Controls 120 also include a first foot pedal 124 actuatable by the operator to control the acceleration and speed of vehicle 100 through the control of an engine described in more detail in U.S. Provisional Application Ser. No. 60/918,502 filed Mar. 16, 2007, titled "VEHICLE", and a second foot pedal 126 actuatable by the operator to decelerate vehicle 100 through a braking system described in more detail in U.S. Provisional Application Ser. No. 60/918,502 filed Mar. 16, 2007, titled "VEHICLE". Additional details regarding the operator area, including controls 120, are provided in U.S. Provisional Application Ser. No. 60/918,556 filed Mar. 16, 2007, titled "VEHICLE".

Frame 104 includes a portion 130 extending above operator area 114. Portion 130 is provided to protect the occupants of operator area 114 if vehicle 100 tips or rolls over. In the illustrated embodiment, portion 130 is a roll cage 132. In one embodiment, portion 130 is moveable from a first position protecting operator area 114 to a second position which provides vehicle 100 with a smaller envelope than when portion 130 is in the first position. Additional details about exemplary moveable portions are provided in U.S. Provisional Application Ser. No. 60/918,500 filed Mar. 16, 2007, titled "METHOD AND APPARATUS RELATED TO TRANSPORTABILITY OF A VEHICLE".

Vehicle 100 further includes a front platform 140 supported by frame 104 and a rear platform 150 supported by frame 104. Both front platform 140 and rear platform 150 are shown having a support surface 142 and 152, respectively.

Support surfaces 142 and 152 may be flat, contoured, and/or comprised of several sections. In addition, one or both of front platform 140 and rear platform 150 may include upstanding walls to define a cargo box extending over at least a portion of the respective platform 140 and 150. The platforms are not covered by any vehicular components and are therefore normally exposed.

Further, portions of front platform 140 and rear platform 150, along with portion 130 of frame 104 may include devices for attaching various types of assets to vehicle 100. Exemplary assets including cargo containers, seats, gun mounts, footrests, and other suitable assets. Additional details regarding rear platform 150 are provided in U.S. Provisional Application Ser. No. 60/918,356 filed Mar. 16, 2007, titled "UTILITY VEHICLE HAVING MODULAR COMPONENTS".

Figure 8:
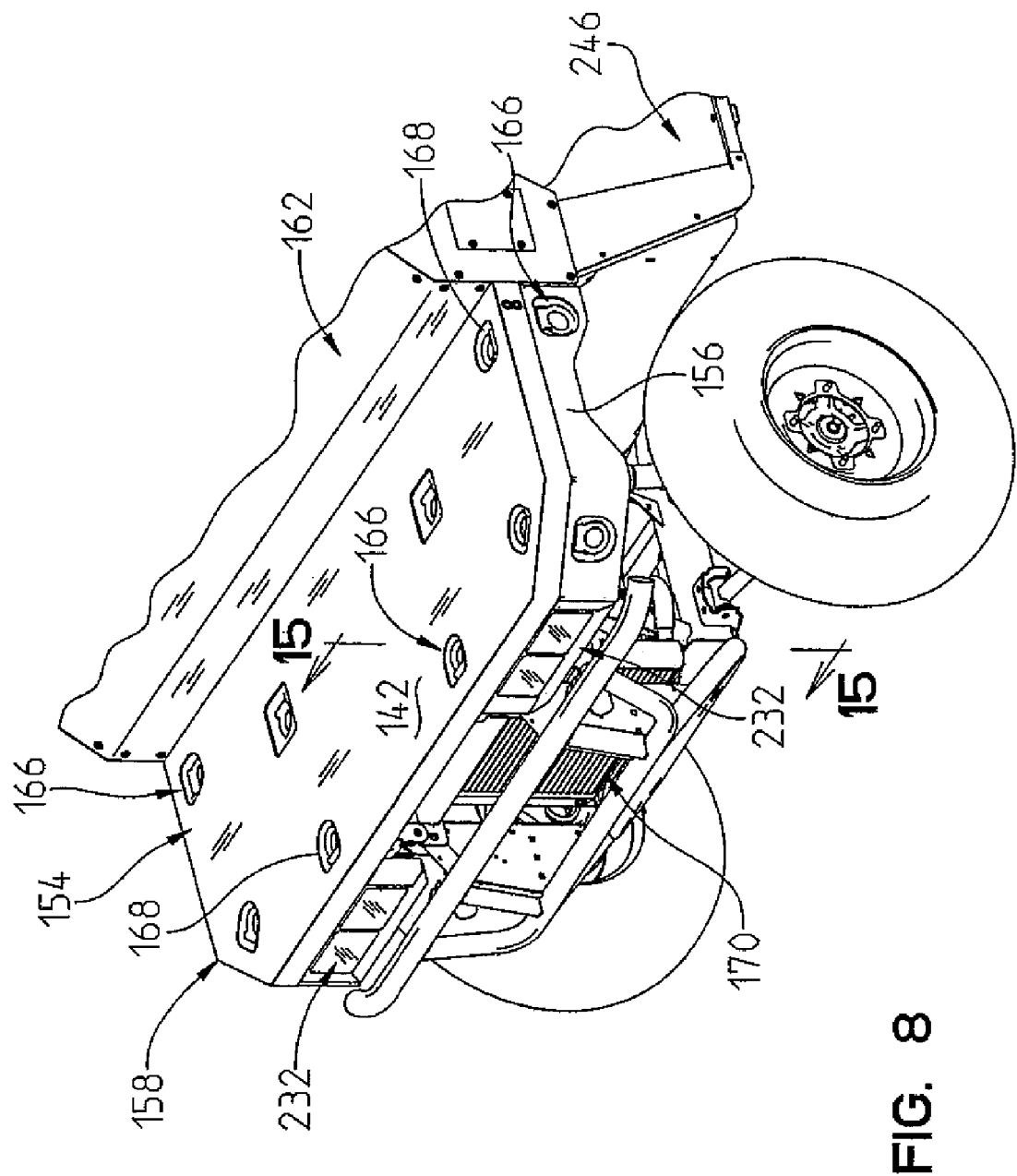
FIG. 8 is an enlarged perspective view of the front of the vehicle of FIG. 1 showing the front platform in a closed position.
Figure 9:
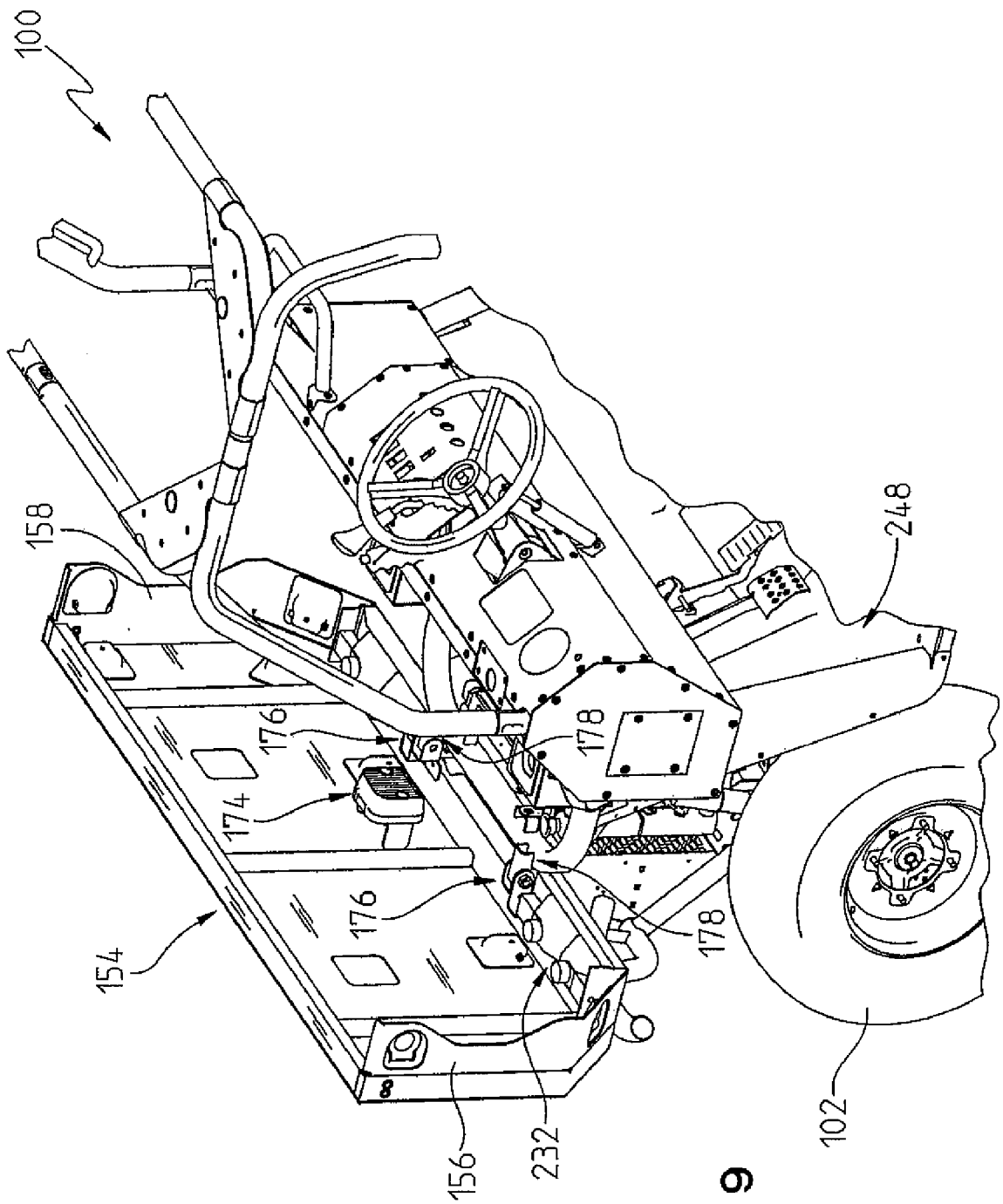
FIG. 9 is showing a front platform of the vehicle moved to an open position.

Several areas of vehicle 100 are designed to utilize the available space for storage, providing access to vehicle components, mounting or supporting equipment and other items, and for other functions. As shown in FIGS. 8 and 9, front platform 140 is configured to support various pieces of equipment, provide storage, and provide access to vehicle components.

Front platform 140 includes an upper plate 154 and a pair of sidewalls 156, 158. The preferred embodiment of upper plate 154 is about 60 inches wide (from Driver's side to passenger side), about 22 inches deep (from front to back), and substantially flat, but may be contoured. Plate 154 defines support surface 142 that supports various pieces of equipment, such as storage containers, weapons (guns, artillery pieces, etc.) ammunition, passenger seats, etc. Support surface is about 38.5 inches above the ground, but may be higher or lower.

Figure 2:
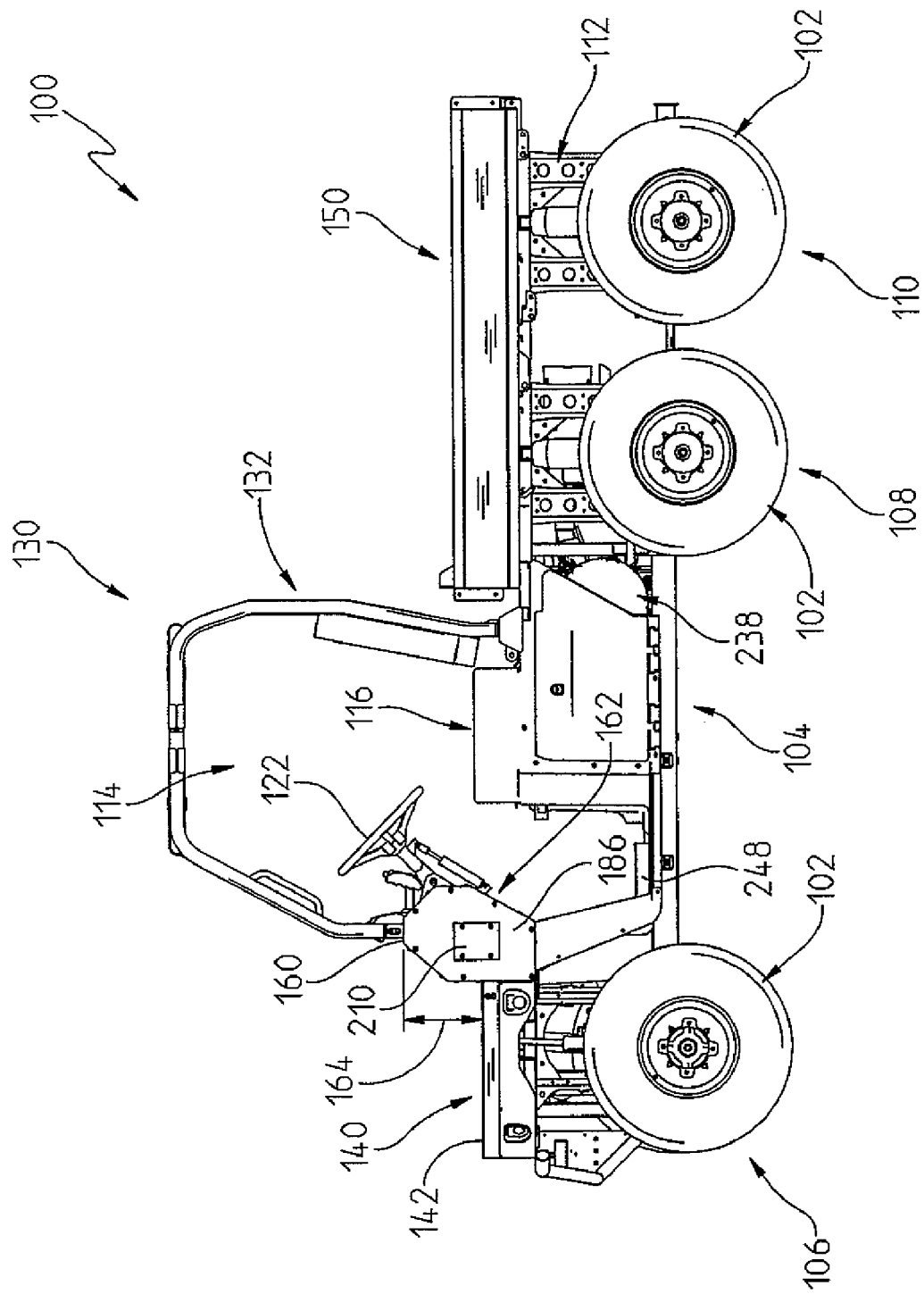
FIG. 2 is a side view of the first side of the vehicle of FIG. 1.
Figure 3:
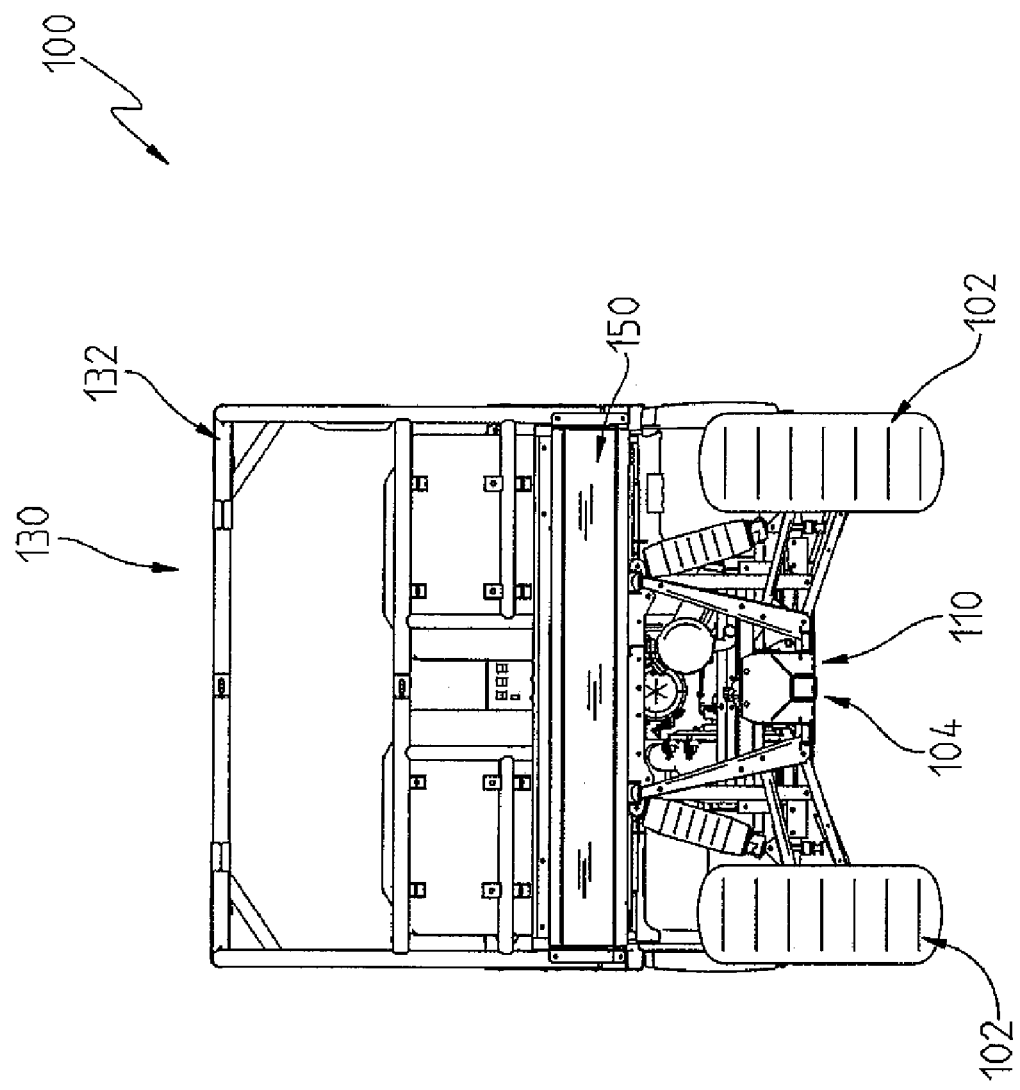
FIG. 3 is a rear view of the vehicle of FIG. 1.

Support surface 142 is positioned relative to operator area 114 to facilitate carrying cargo and preserving the sight line of the occupants in operator area 114 and the ability of the occupants to use equipment. As shown in FIG. 2, support surface 142 is positioned below an upper-most surface 160 of dashboard 162. A vertical distance 164 between upper-most surface 160 and support surface 142 is about 10 inches. According to other embodiments, distance 164 may be other values, such as about 6, 8, 12, 14, or 16 inches or other values. By providing vertical distance 164, 10 inches of cargo can be mounted to front platform 140 without substantially obstructing the view of the occupants of vehicle 100. Additionally, equipment mounted on or near dashboard 162 may extend over front platform 140. Such equipment may include a machine gun or other weapon mounted on dashboard 162. An operator, such as a passenger positioned in operator area 114, can fire the machine gun from within operator area 114 without interference from cargo stored on front platform 140. Distance 164 and the elevation of the machine gun barrel above dashboard 162 allow the barrel to extend over front platform 140 and the cargo stored thereon without substantially interfering with the use of the machine gun.

As shown in FIG. 8, front platform 140 includes a plurality of D-clips 166 and recesses 168 are provided in upper plate 154 and sidewalls 156, 158 to receive D-clips 166. When in a storage position, D-clips 166 are positioned within recesses 168 so they are below the respective cargo supporting surfaces. When in a use position, D-clips 166 extend from recesses 168 so that straps, ropes, stretchable cords, and other tie downs can catch or extend through D-clips 166 to hold a piece of equipment in place.

According to an alternative embodiment of the present disclosure, through mounting apertures (not shown) are provided in upper plate 154 and sidewalls 156, 158 to receive expansion retainers (not shown) with or without D-clips 166.

Additional details of such mounting apertures and expansion retainers are provided in U.S. Pat. No. 7,055,454, to Whiting et al., filed Jul. 13, 2004, titled "Vehicle Expansion Retainers," the disclosure of which is expressly incorporated by reference herein. Front platform 140 may also be provided with the various mounting devices, mounting patterns, and other mounting features of rear platform 150 described in U.S. Provisional Application Ser. No. 60/918,356 filed Mar. 16, 2007, titled "UTILITY VEHICLE HAVING MODULAR COMPONENTS", the disclosure of which is expressly incorporated by reference herein. Because the mounting features of front and rear platforms 140, 150 match, equipment that can be mounted on rear platform 150 may also be mounted on front platform 140 and vice versa.

Upper plate 154 and sidewalls 156, 158 are coated with a non-slip material to reduce sliding or shifting of equipment. According to a preferred embodiment, upper plate 154 and sidewalls 156, 158 are sprayed with a polymer, such as polyurethane, polyurethane with urea, and other coating materials used for spray-on truck bed liners.

As shown in FIG. 9, front platform 140 can be moved to an open position to permit access to vehicle components positioned under platform 140. Such components may include a radiator 170, suspension components 172, rectifier 174, and other components shown in FIGS. 10 and 15. Front platform 140 includes a pair of brackets 176 that are mounted to an underside of upper plate 154. Frame 104 of vehicle 100 includes a pair of corresponding brackets 178 and a bolt or other hinge member is provided between brackets 176, 178 to define an axis about which front platform 140 rotates.

A gas spring (not shown) extends from front platform 140 to another component of vehicle 100, such as frame 104, to support front platform 140 in the raised position. Other devices, such as torsion springs, may be provided between brackets 176 of front platform 140 and brackets 178 of frame 104 to assist in holding front platform 140 in the raised position.

When in the lowered position, brackets 181 (shown in FIG. 10) support front platform 140 in the closed or lowered position. To hold front platform 140 in the closed position, a fastener (not shown) is provided that extends from front platform 140 to brackets 181. For example, according to on embodiment, bolts (not shown) are provided that extend from front platform 140 to brackets 181 of frame 104. According to another embodiment, over-center latches (not shown) are provided that extend from rearward portions of sidewalls 156, 158 to dashboard 162.

Several components of vehicle 100 are positioned within dashboard 162. A master cylinder 184 (shown in FIGS. 11 and 12) of the brake system of vehicle 100 is positioned within dashboard 162. Master cylinder 184 is positioned behind a sidewall 186 (shown in FIG. 2) of dashboard 162 and is accessible through an opening 188 provided on a front portion 190 of dashboard 162 shown in FIG. 13. Opening 188 is normally covered with a panel (not shown). To check the brake fluid level of master cylinder 184, the panel is removed or swung open to provide access a filler cap 196 (shown in FIGS. 11 and 12) of master cylinder 184. If necessary, brake fluid can be added to master cylinder 184 through dashboard 162 through opening 188 uncovered by the panel. To facilitate checking the brake fluid, opening 188 is large enough for filler cap 196 to pass through. Other components, such as fuses, air filters, etc. may also placed behind opening 188 to permit access through dashboard 162.

As shown in FIG. 11, master cylinder 184 is mounted to a frame member 192 of dashboard 162 that has a profile matching the outer profile of dashboard 162. Master cylinder 184 includes a fluid reservoir 194 with filler cap 196 mounted thereon, a piston cylinder 198, and a piston 200. To pressurize the brake fluid, the driver presses on brake pedal 126. Brake pedal 126 is pivotably coupled to frame 104 and rotates about axis 202. An upper arm 204 of brake pedal 126 is pivotably coupled to piston 200. When the driver steps on brake pedal 126 in direction 206 to slow vehicle 100, piston 200 moves in a substantially opposite direction 208 to pressurize the brake fluid.

Figure 4:
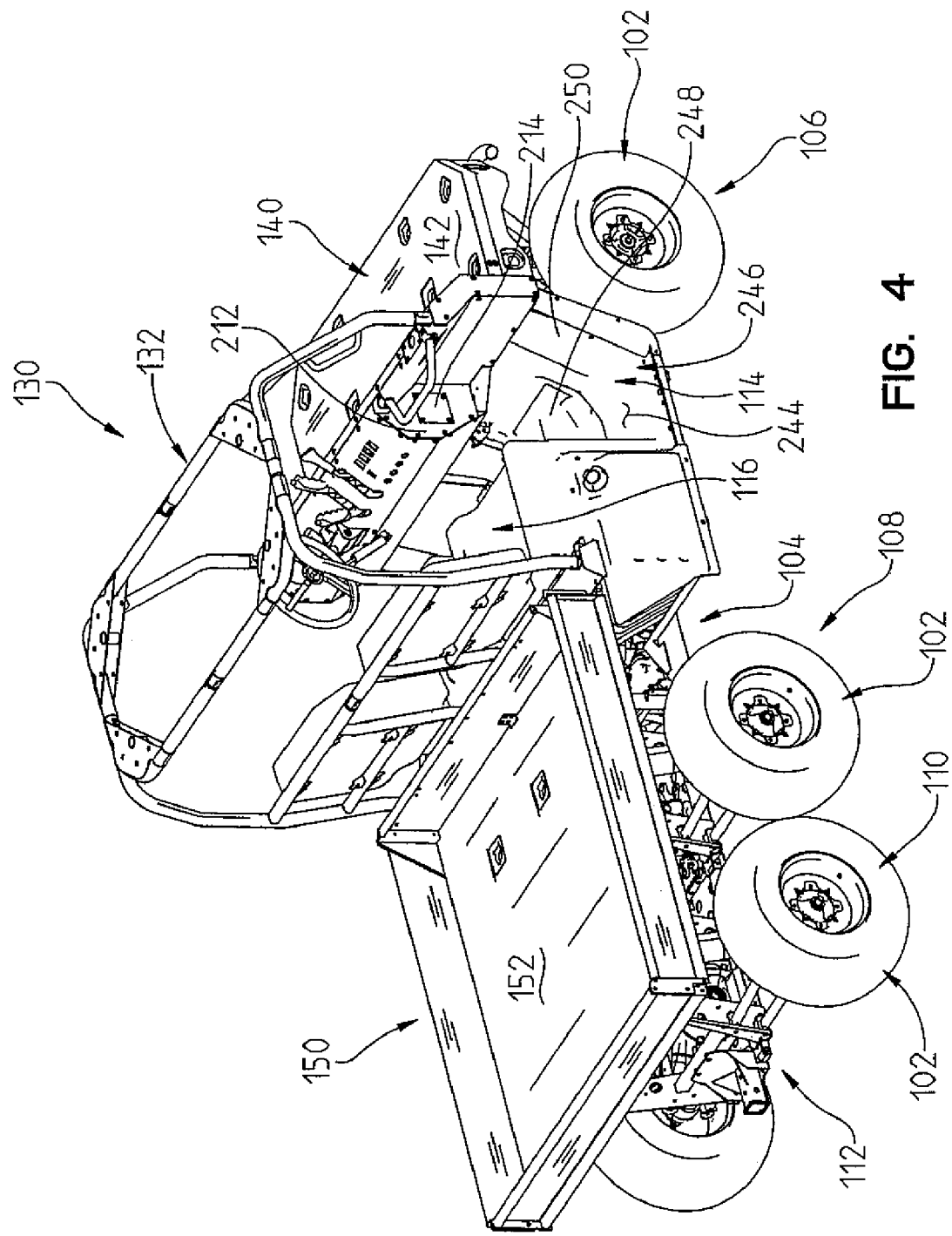
FIG. 4 is a rear, perspective view of the vehicle of FIG. 1 from a second side of the vehicle.
Figure 5:
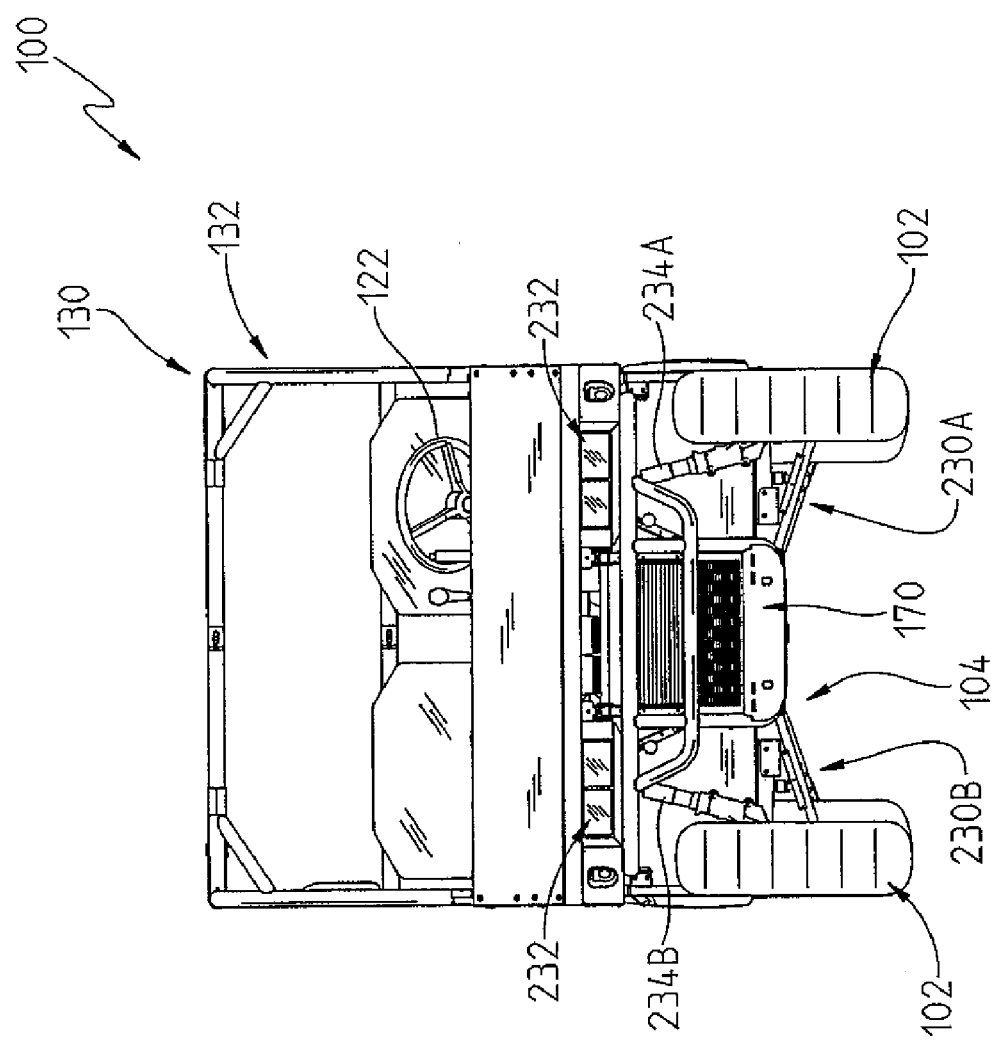
FIG. 5 is a front view of the vehicle of FIG. 1.
Figure 6:
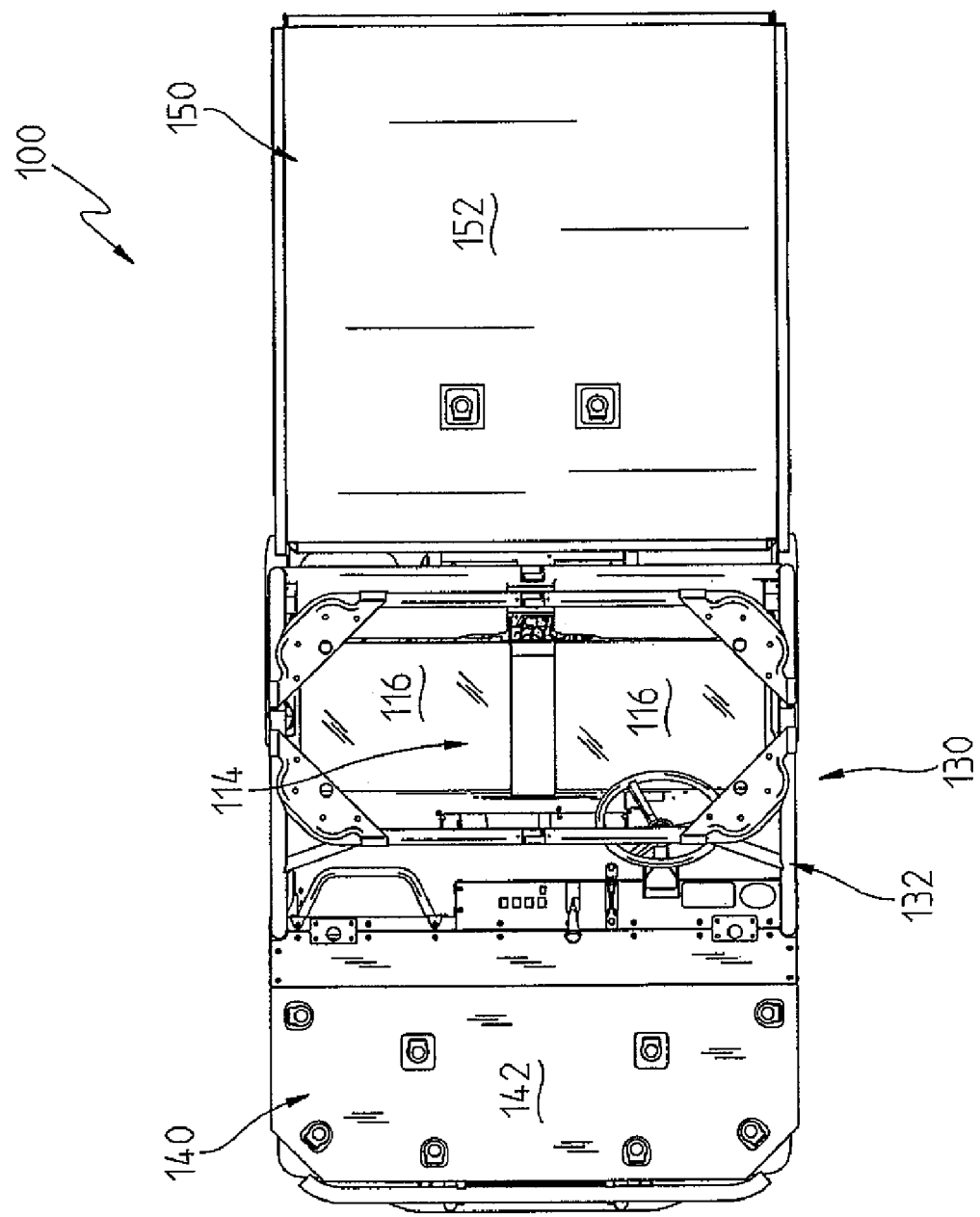
FIG. 6 is a top view of the vehicle of FIG. 1.
Figure 7:
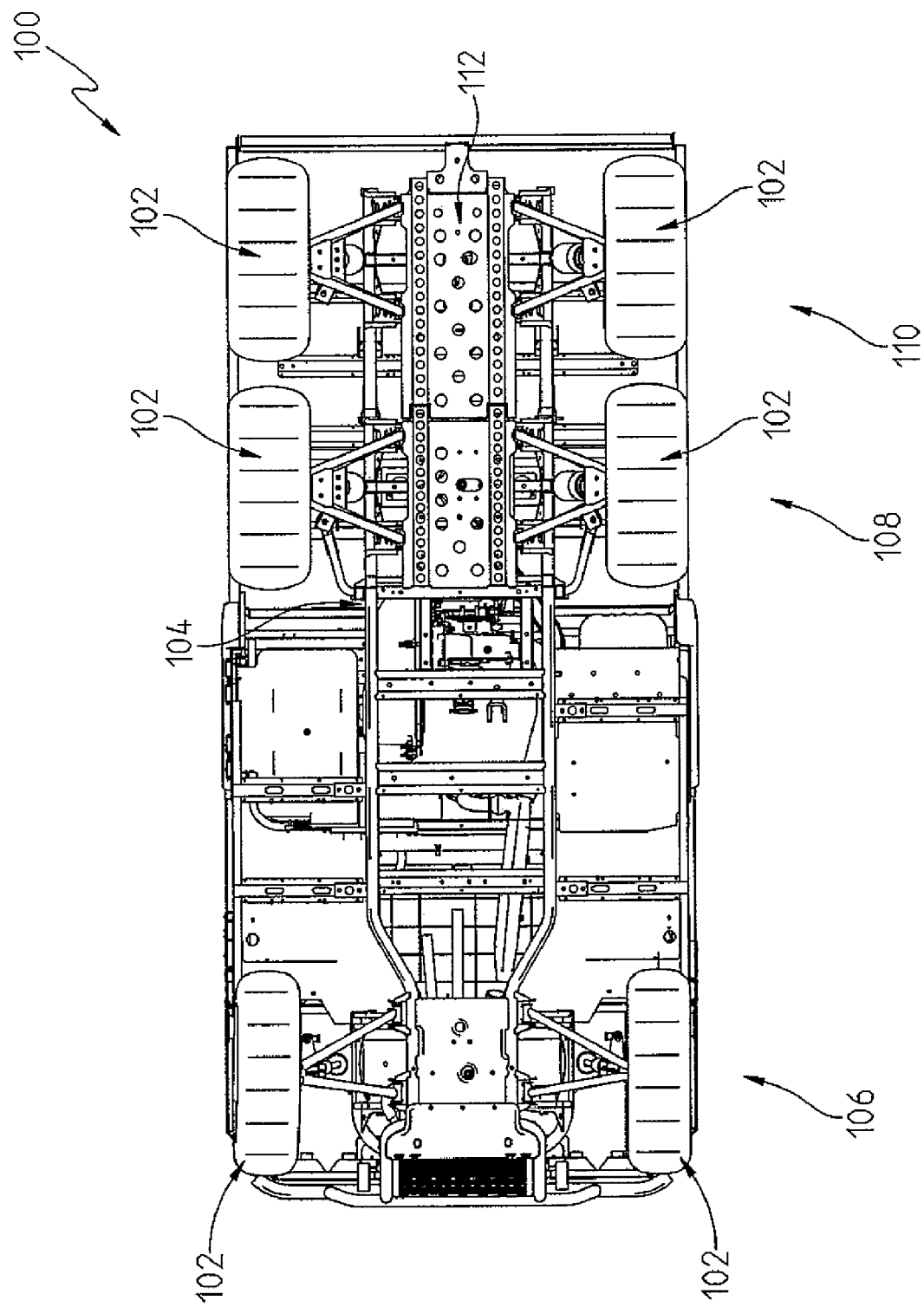
FIG. 7 is a bottom view of the vehicle FIG. 1.

According to one embodiment of vehicle 100, the electrical fuses (not shown) of vehicle 100 can be accessed through a panel 210 (shown in FIG. 2) provided on sidewall 186 of dashboard 162. Panel 210 is removed or swung open to provide access to electrical fuses positioned behind sidewall 186. According to another embodiment, an opposite sidewall 212 (shown in FIG. 4) is provided with a panel 214. Panel is removed or swung open to provide access to electrical fuses positioned behind sidewall 212.

Figure 13:
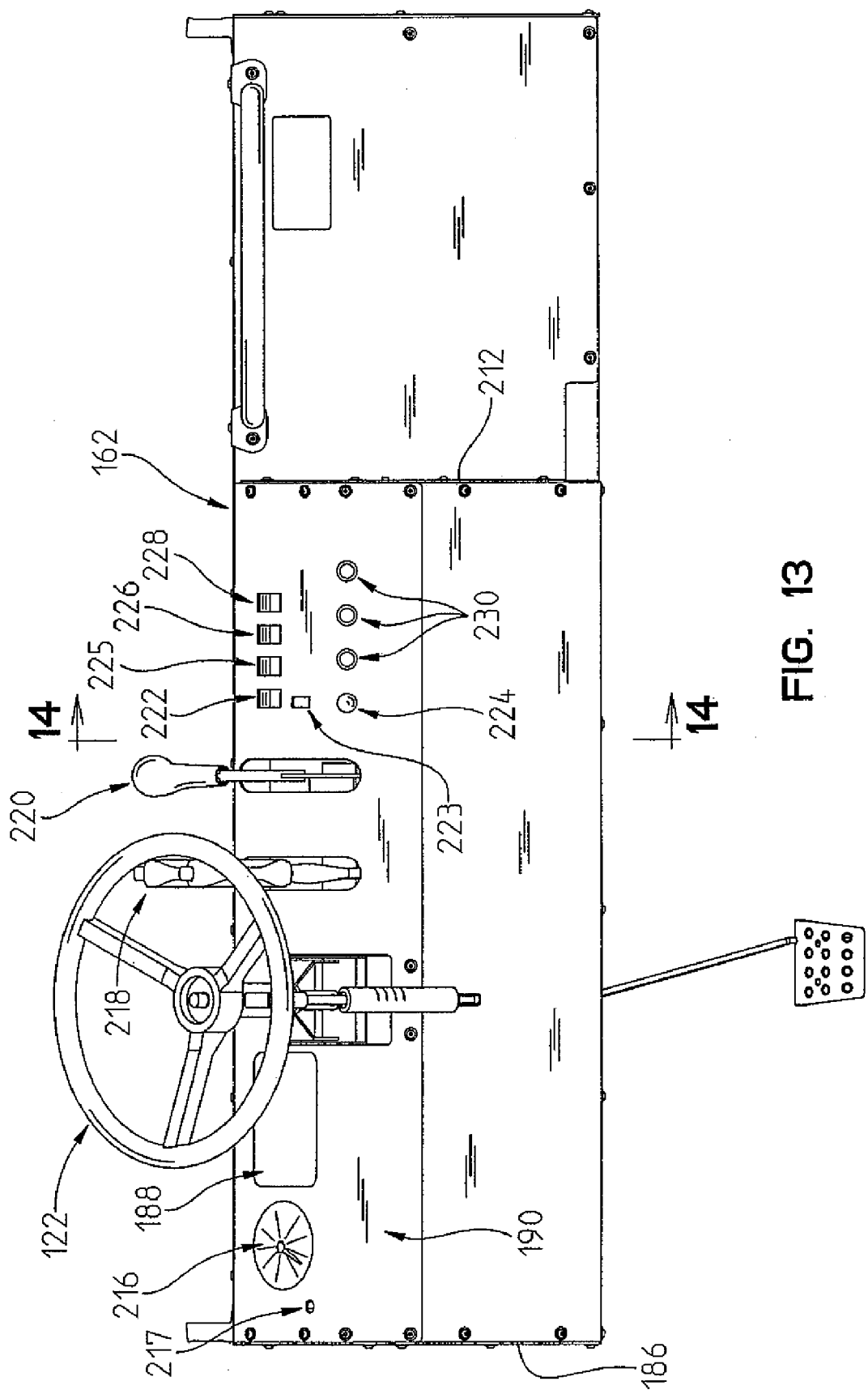
FIG. 13 is an elevation view of a dashboard of the vehicle of FIG. 1.

As shown in FIG. 13, dashboard 162 includes several controls 120 and instruments. From left to right, dashboard 162 includes a speedometer mode switch 217, a speedometer 216, master cylinder access panel 188, steering wheel 122, brake lever 218, high, low, and reverse shift lever 220, wheel drive switch 222, active-descent-control (ADC) switch 223, ignition switch 224, visible light switch 225, IR light switch 226, blackout switch 228, and a plurality of 12 volt power outlets 230. Ignition switch 224 is preferably a toggle switch that does not require a key to start the engine.

Speedometer 216 displays vehicle speed and various distance and operational indicators. Speedometer 216 includes a plurality of modes controlled by speedometer mode switch 217. These modes may include a vehicle odometer reading, multiple trip indicators, a vehicle hour meter, a trip hour meter, and other operational values of the vehicle, such as oil pressure, fuel level, and other operational values. When pressed, mode switch 217 activates a menu displayed on speedometer 216. Each time mode switch 217 is pressed, it switches to a different mode. For example, when pressed the first time, a first trip indicator is displayed. If the operator repeatedly presses mode switch 217, it will scroll through the various modes and display the information associated with the mode. Some modes can be reset. For example, if the operator holds mode switch 217 for a predetermined time, such as three seconds, while displaying the first trip indicator, the first trip indicator resets.

To switch the vehicle brake between the parked and released positions, the operator moves brake lever 218. To switch between high gear, low gear, reverse, and park, the driver moves shift lever 220 up and down to the appropriate position.

Headlights 232 and other light sources on vehicle 100 emit visible light. To turn headlights 232 on and off, the driver operates visible light switch 225 between high beam, low beam, or off. Vehicle 100 is also provided with IR headlights (not shown) and other IR emitting lights that permit an operator wearing night vision goggles to see when it is dark. Normally, when the IR lights are running, the visible lights, such as headlights 232, are turned off to avoid detection. To turn the IR lights on and off, the driver operates IR light switch 226. In some circumstances, it is desirable to operate vehicle 100 without any lights (visible or IR). In these circumstances, the driver operates blackout switch 228 that turns both the visible and IR lights off. Additional details of a light system having both visible and IR lights is provided in U.S. Pat. No. 7,125,134 to Hedlund et al., filed Oct. 15, 2003, titled "Switch Enabled Infrared Lighting System With Non-IR Light Elimination," the disclosure of which is expressly incorporated by reference herein.

The drive characteristics of vehicle 100 can be altered with wheel drive switch 222 and ADC switch 223. The driver uses wheel drive switch 222 to toggle between two-wheel drive, two wheel drive with a locked differential, and all wheel drive. The driver uses ADC switch 223 to turn the all drive control on and off. Additional details of the various transmission modes of vehicle 100 are provided in U.S. Provisional Patent Application Ser. No. 60/918,502 filed Mar. 16, 2007, titled "VEHICLE".

Figure 10:
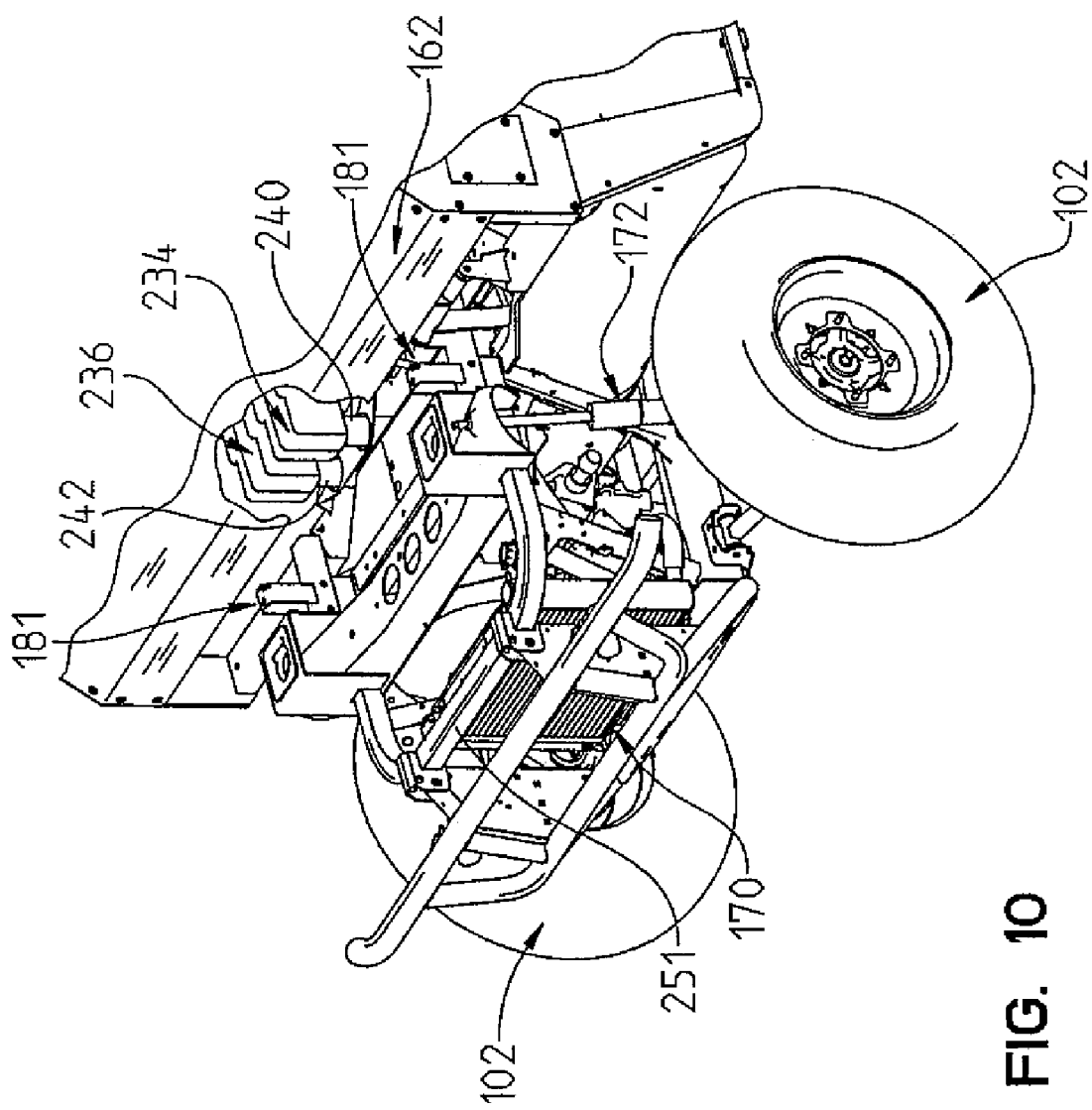
FIG. 10 is a view similar to FIG. 8 showing the front platform removed from the vehicle.
Figure 14:
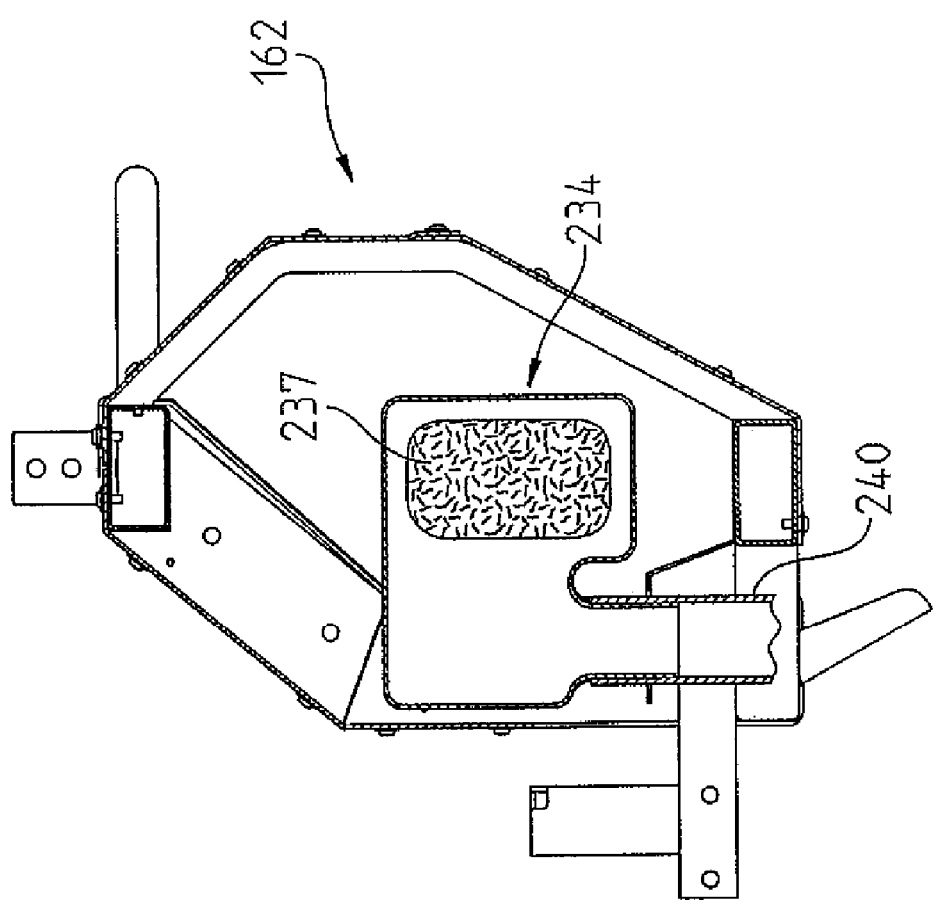
FIG. 14 is a cross-sectional view taken along line 14-14 of FIG. 13 showing an air intake positioned under the dash board of FIG. 13.

As shown in FIGS. 10 and 14, air intakes 234, 236 are also positioned within dashboard 162. Air intake 234 provides air to the engine and air intake 236 provides cooling air to continuously variable transmission (CVT) 238. Additional details on CVT 238 are provided in U.S. Provisional Patent Application Ser. No. 60/918,556 filed Mar. 6, 2007, titled "VEHICLE". Respective tubes 240, 242 are provided to route air to the engine and CVT 238. Tubes 240, 242 extend downward through the bottom of dashboard 162 (shown in FIG. 10) and rearward along an upper surface 244 of a floorboard 246 of vehicle 100. A cover 248 (shown in FIG. 2) is positioned over tubes 240, 242 and coupled to upper surface 244. Tubes 240, 242 then extend under seating 116 to the engine air intake manifold and CVT 238, respectively. Each air intake 234, 236 includes an air filter 237 to prevent dirt and other debris from enter the engine and CVT 238.

Because air intakes 234, 236 are positioned in dashboard 162, they are positioned above the engine and CVT 238. This permits the engine and CVT 238 to operate without the intrusion of water if the engine and/or CVT 238 are submersed in water, for example, when crossing a ditch, creek, river, pond, or other body of water. According to the preferred embodiment of the present disclosure, air intakes 234, 236 are positioned about 42 inches above the ground. Additionally, because air intakes 234, 236 are preferably positioned in dashboard 162, they are partially positioned rearward of a footrest portion 250 of floorboard 246, above and rearward of front platform 140, forward of steering wheel 122, and forward of the engine and CVT 238. Additional relative relationships of air intakes 234, 236 are inherent based on the figures.

Figure 15:
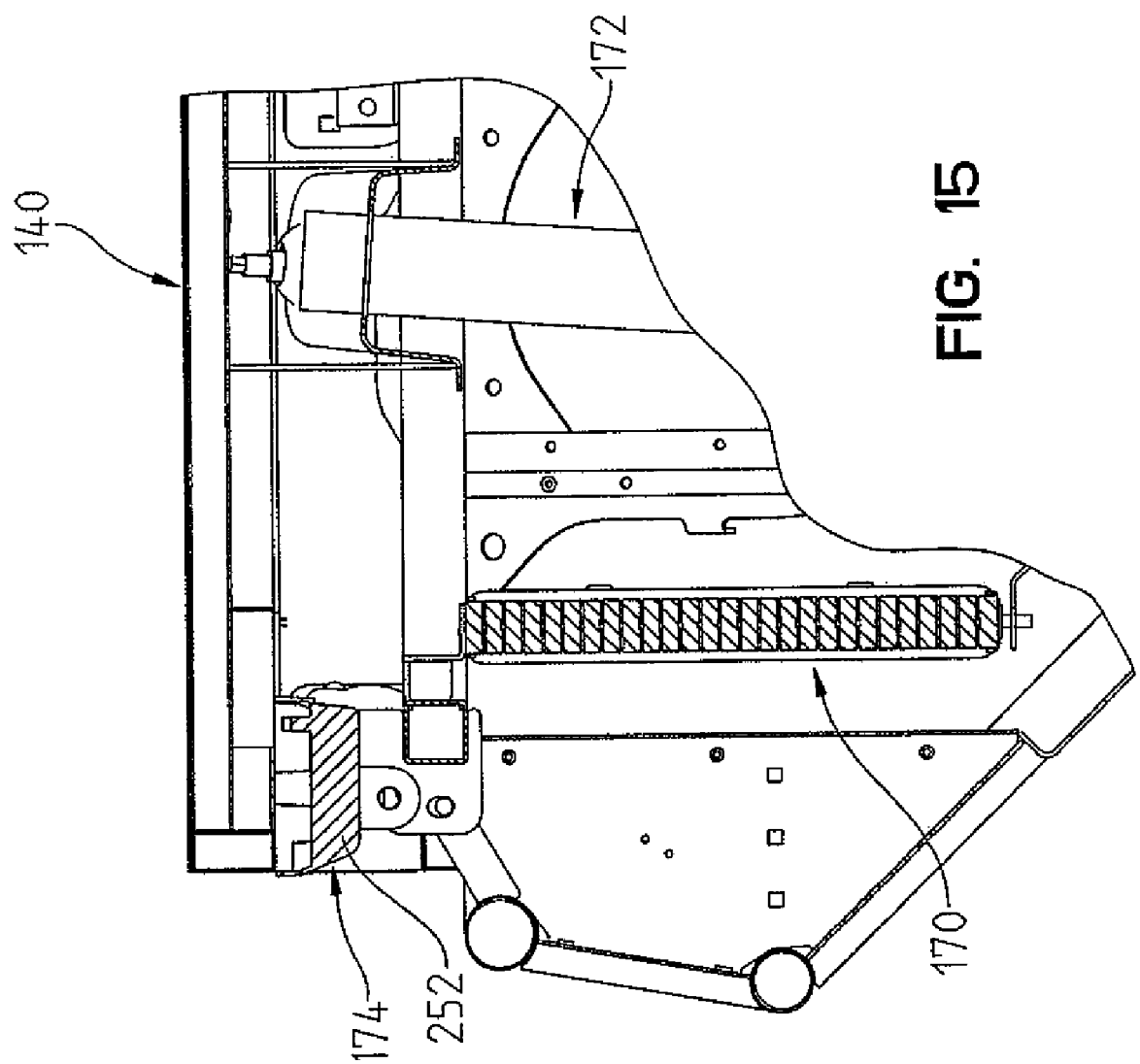
FIG. 15 is a cross-sectional view of a front end of the vehicle of FIG. 1 taken along line 15-15 of FIG. 8.

As shown in FIG. 15, rectifier 174 is mounted to an underside of upper plate 154 of front platform 140. Rectifier 174 may also be mounted in other locations, such as on the middle, upper surface of frame member 251 shown in FIG. 10. Rectifier 174 receives AC current from a stator (not shown) coupled to the engine. Rectifier 174 converts the AC current to a DC current and provides the DC current to battery 260 which is coupled to DC power outlets 230 and other DC devices of vehicle 100. Rectifier 174 produces waste heat during conversion of the AC current to DC current. To remove this waste heat and avoid overheating, rectifier 174 includes a plurality of heat fins 252. Preferably, heat fins 252 are exposed to a relatively cool source of air to increase the heat transfer rate.

According to the preferred embodiment of the present disclosure, rectifier 174 is positioned on the cool side of radiator 170 as shown in FIG. 15. In the present configuration, the cool side of radiator 170 is on the front side and the hot side of radiator 170 is on the back side of radiator 170. Because radiator 170 transfers heat from the engine coolant to the air, the air on the back or hot side of radiator 170 is hotter than the air on the cool side of radiator 170. Because rectifier 174 is positioned on the cool side of radiator 170, it is not exposed to the hotter air exiting radiator 170 and has a higher heat transfer rate at heat fins 252.

Figure 16:
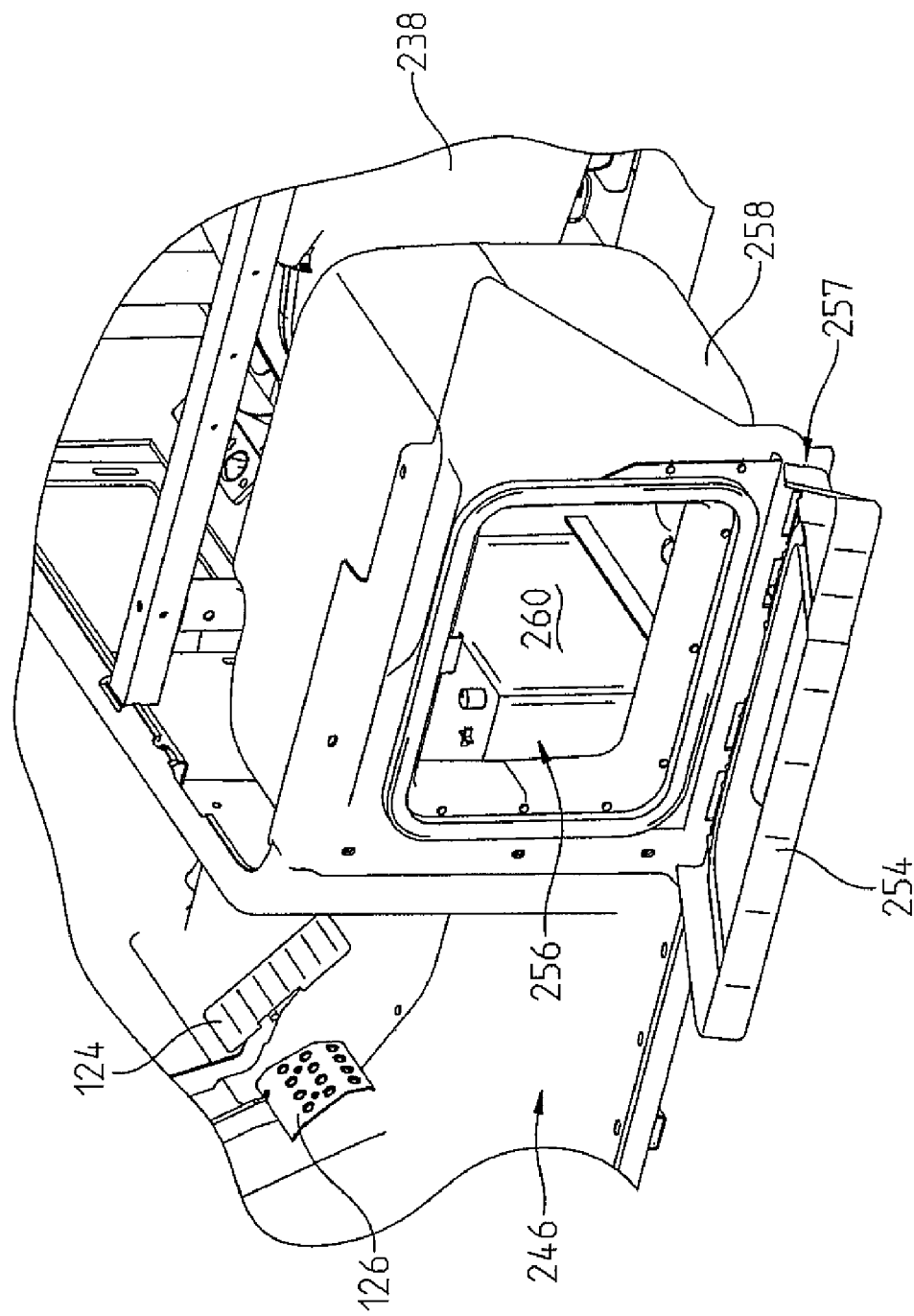
FIG. 16 is a perspective view of a portion of the vehicle of FIG. 1 below the driver's seat.

In addition to front and rear platforms 140, 150, vehicle 100 includes other areas for storage of cargo. One such area includes spaces below seating 116. As shown in FIG. 16, an access and storage area is provided on the driver's side of vehicle 100 under seating 116. Vehicle 100 includes a driver's side door 254 that rotates from a closed position (as shown in FIG. 1) to an open position (as shown in FIG. 16) about hinges 257. When open, side door 254 provides access to an interior region 256 defined by compartment body 258. Battery 260 is positioned within interior region 256. According to one embodiment, interior region 256 defines a through passage that extends to CVT 238 to permit servicing thereof. As shown in FIG. 16, an area rearward of battery 260 is available for storage of tools, ammunition, and other items. According to another embodiment, compartment body 258 is sealed and a seal or gasket is provided for door 254 to seal off interior region 256 when door 254 is closed. When sealed, battery 260 and the other items in interior region 256 are protected from liquids, such as water. According to another embodiment, battery 260 and the other electrical components are not positioned in interior region 256 and compartment body 258 is removable.

Figure 17:
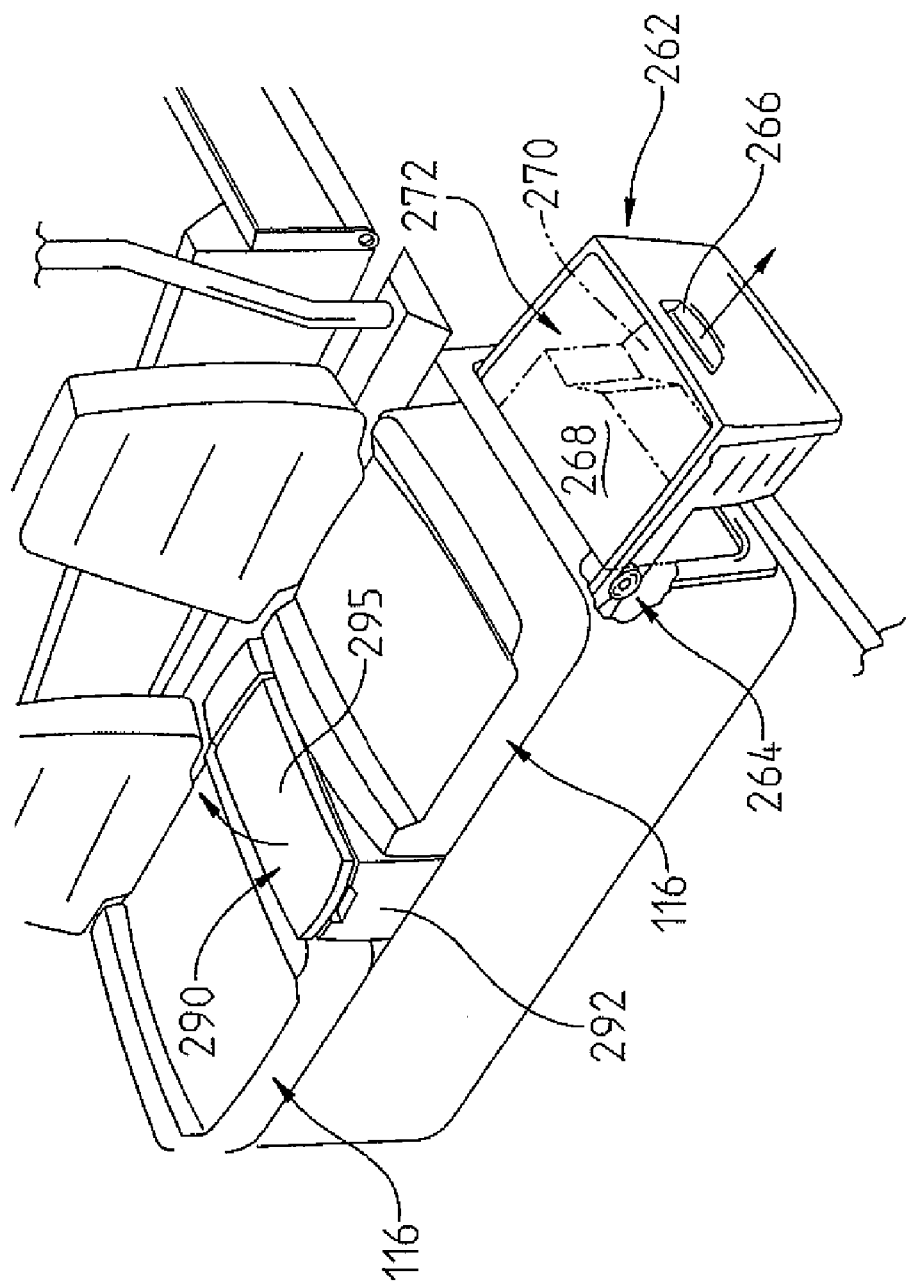
FIG. 17 is a perspective view of an alternative embodiment storage arrangement for the vehicle of FIG. 1.

Another alternative embodiment under-seat storage arrangement is shown in FIG. 17. A compartment 262 is supported on tracks 264 mounted underneath seating 116. Tracks 264 may be of any type including those provided on cabinet or desk drawers. Compartment 262 includes a handle portion 266 and includes a latch mechanism (not shown) to hold compartment 262 in the closed position. As shown in FIG. 17, compartment includes an upper shelf 268 and a lower shelf 270. An area below upper shelf 268 may contain another vehicle component(s), such as battery 260, CVT 238, portions of the engine, or any other vehicle component. Compartment 262 may be provided with a seal or gasket (not shown) so that an interior region 272 of compartment is air and liquid tight when closed. Additionally, compartment 262 may be removed from tracks 264.

Figure 18:
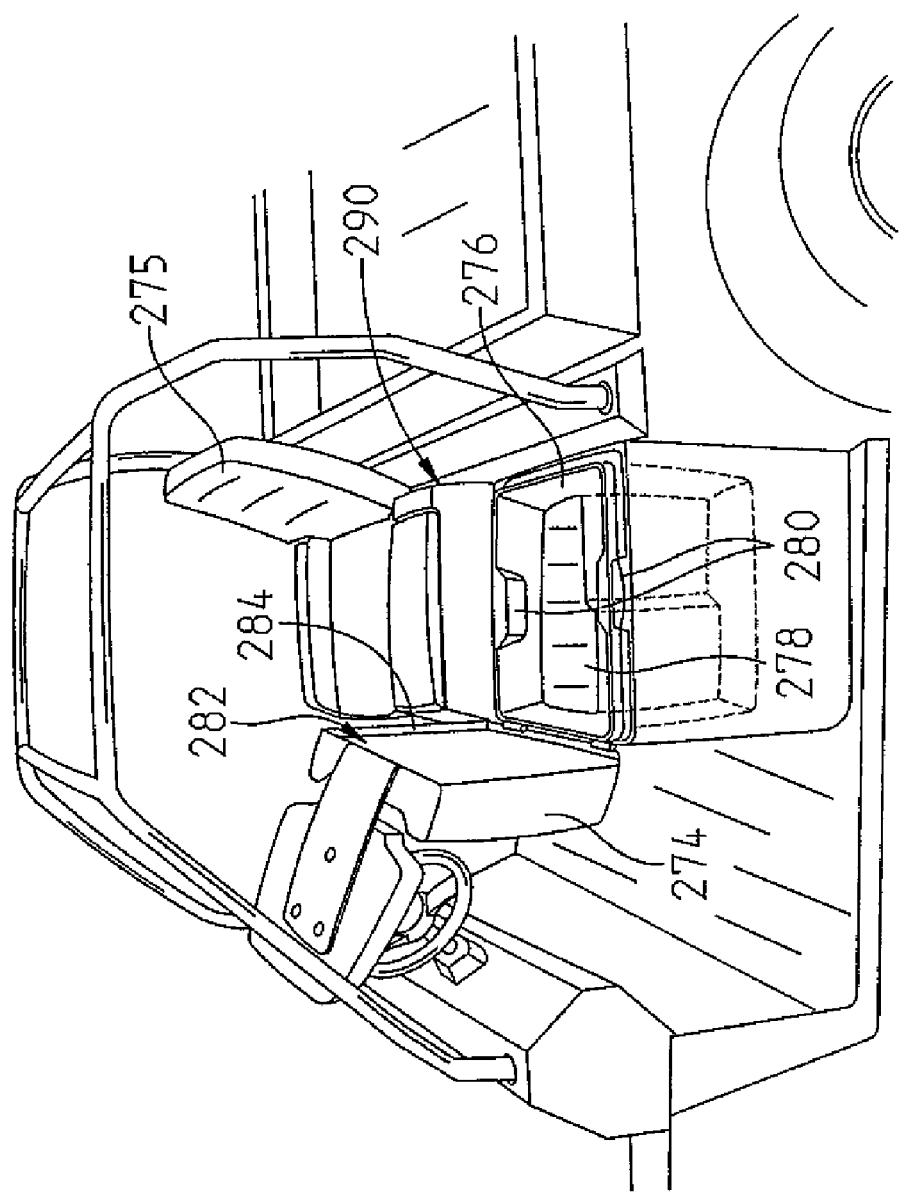
FIG. 18 is a perspective view of another alternative embodiment storage arrangement for the vehicle of FIG. 1.

Another alternative embodiment under-seat storage arrangement is shown in FIG. 18. Driver's seat 274 and passenger seat 275 pivot forward to expose storage tray 276. When exposed, items 278 can be removed from storage tray 276 or storage tray 276 can be removed by grasping handles 280. Seats 274, 275 include a downwardly facing recess 282 that receives and seals with an upper portion of storage tray 276. A seal or gasket 284 may be provided to facilitate this sealing. In this arrangement, seats 274, 275 act as roofs over storage tray 276 to keep rain water and other liquids from entering storage tray 276. Seats 274, 275 may also be provided with rubber grommets or other fasteners permitting them to be completely removed to expose the area normally underneath seats 272, 275.

Figure 19:
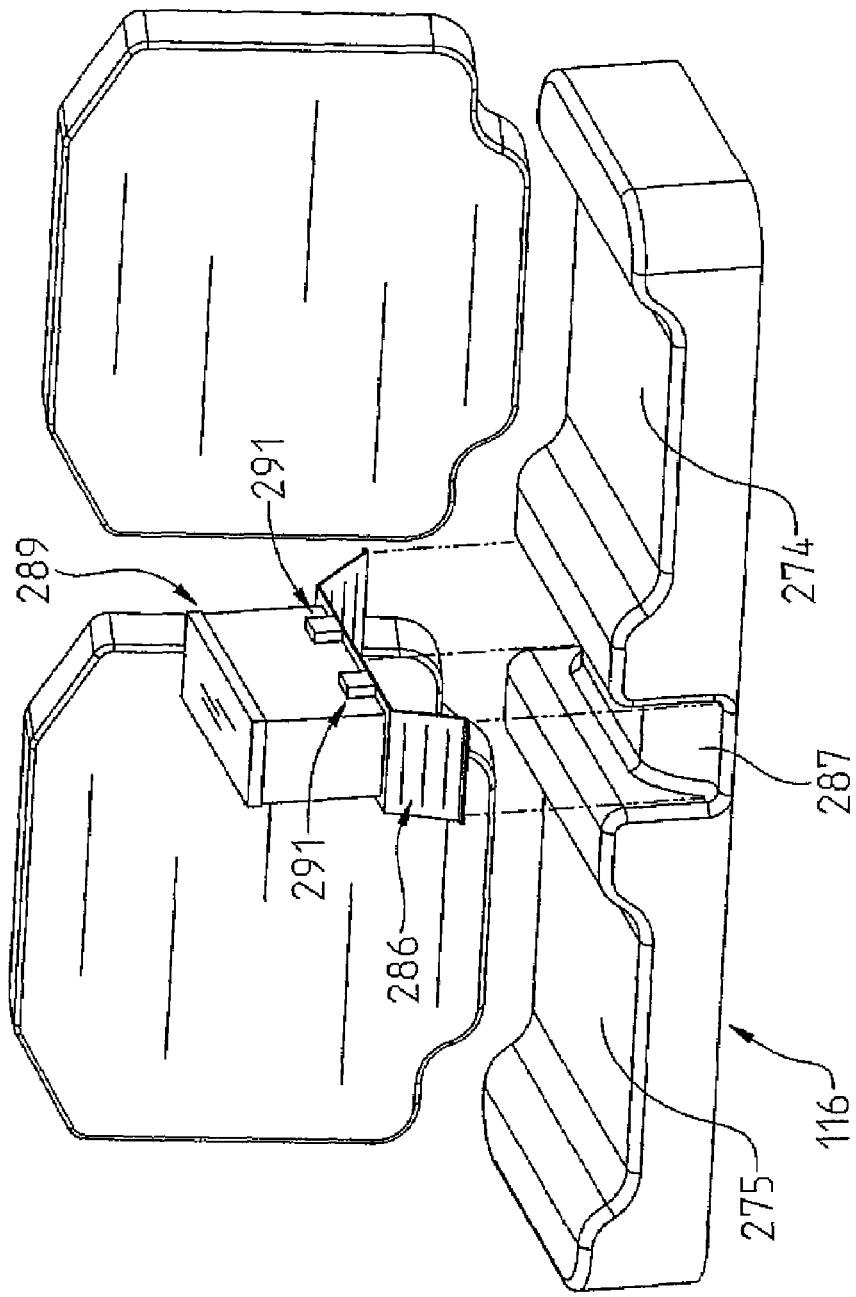
FIG. 19 is a perspective view showing a center console between the driver's and passenger seats of the vehicle of FIG. 1.

In addition to under-seat storage, vehicle 100 also includes above seat storage. As shown in FIG. 19, seating 116 includes a center console 286 between driver's seat 274 and passenger seat 275. Driver's seat 274 and passenger seat 275 are preferably padded with foam or other resilient material. Center console 286 is preferably made of a substantially rigid material, such as metal. Center console 286 is normally secured to middle portion 287 of seating 116 with rivets, adhesive, or other fasteners. Center console 286 is configured to hold a container 289, such as an ammo box. Container 289 is coupled to center console 286 with latches 291 or with straps. Another alternative center console 290 is shown in FIGS. 17 and 18. Center console 290 includes a storage compartment 292 and a hinged top 295 that covers storage compartment 292. Vehicle 100 may also include a foam filler (not shown)

that substantially fills the space between driver's seat 274 and passenger seat 275 to define a relatively flat third seat.

Figure 20A:
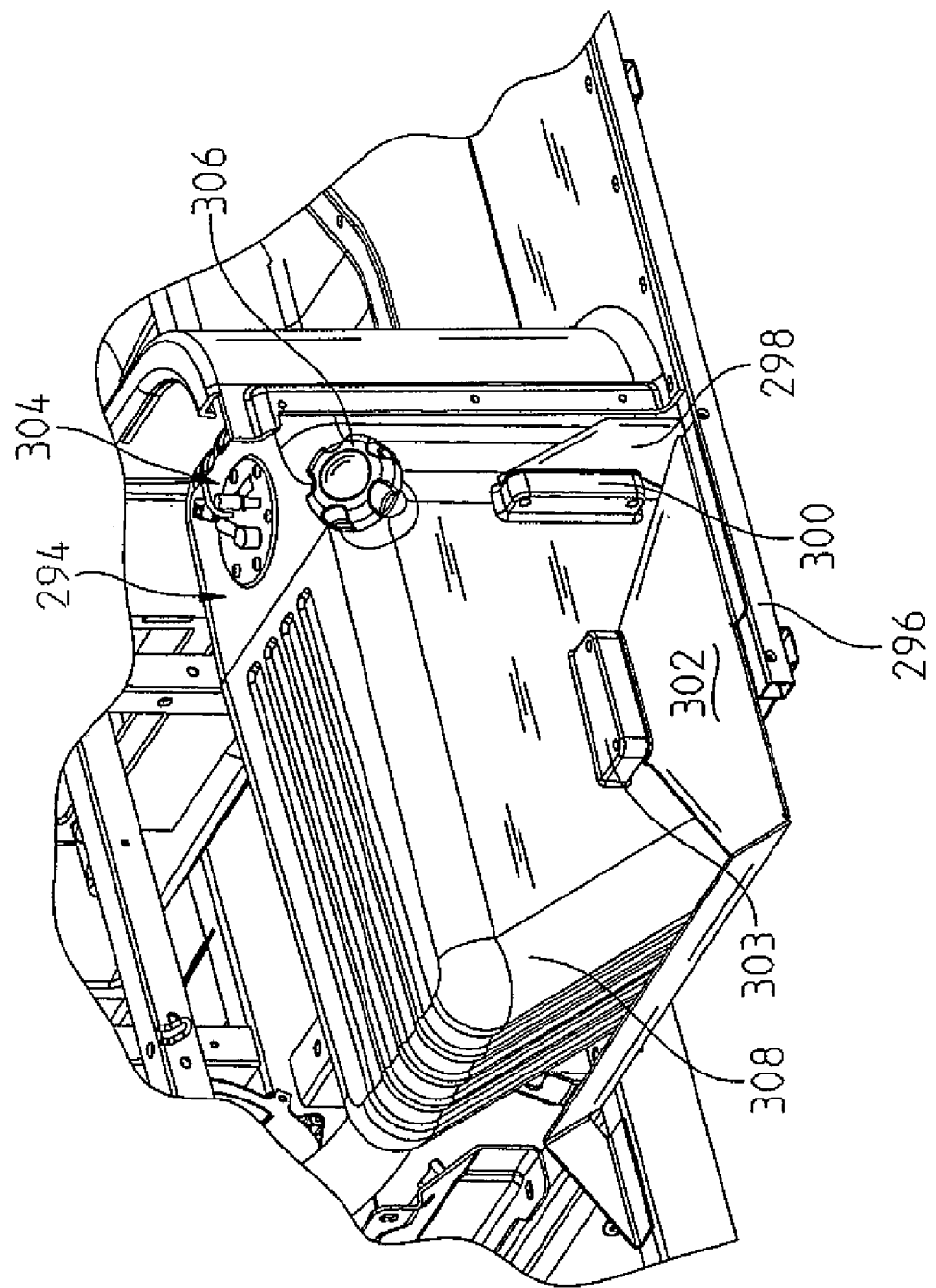
FIG. 20A is a perspective view of a portion of the vehicle of FIG. 1 below the passenger seat showing a fuel tank.
Figure 20B:
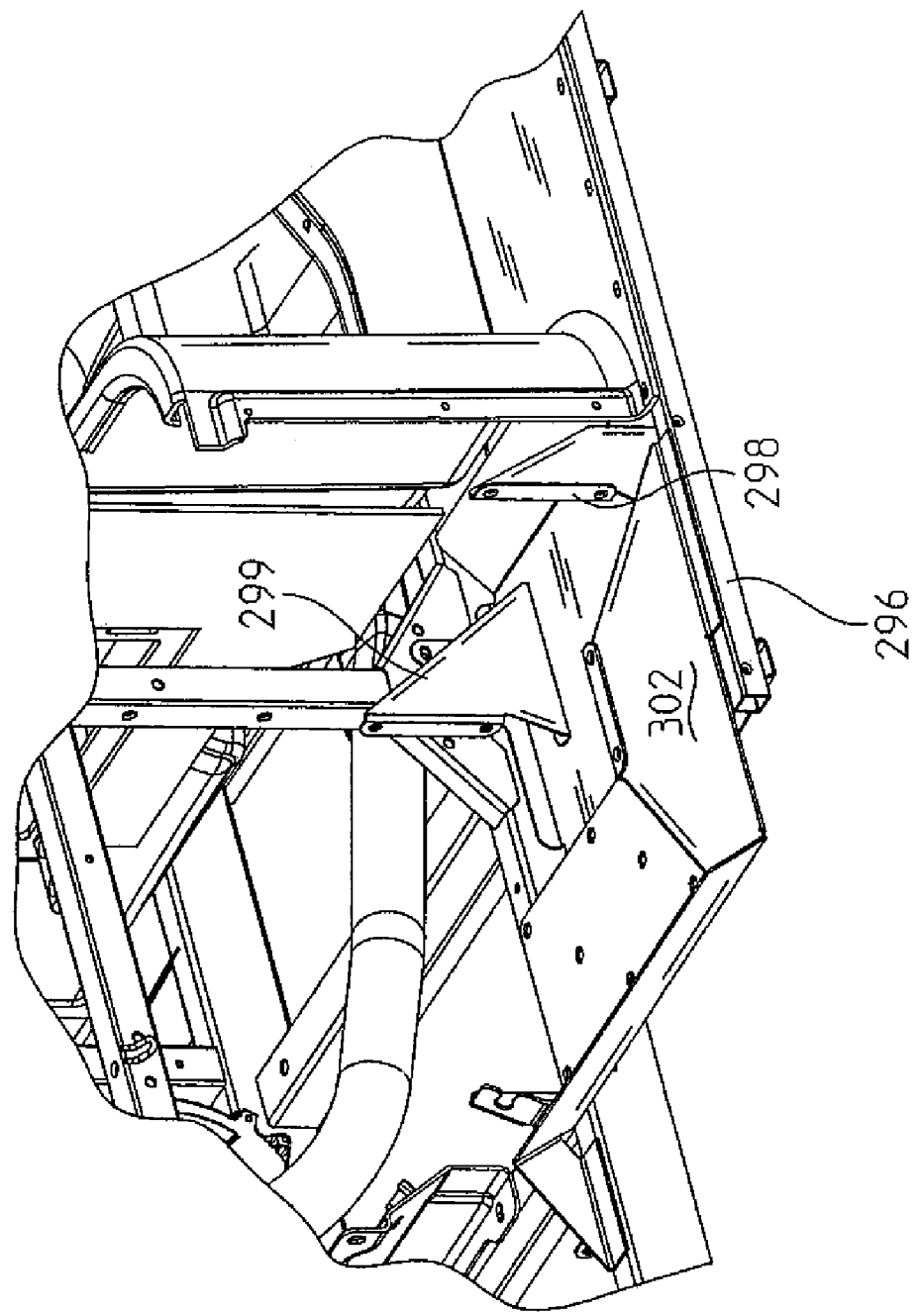
FIG. 20B is a view similar to FIG. 20B with the fuel tank removed.
Figure 21:
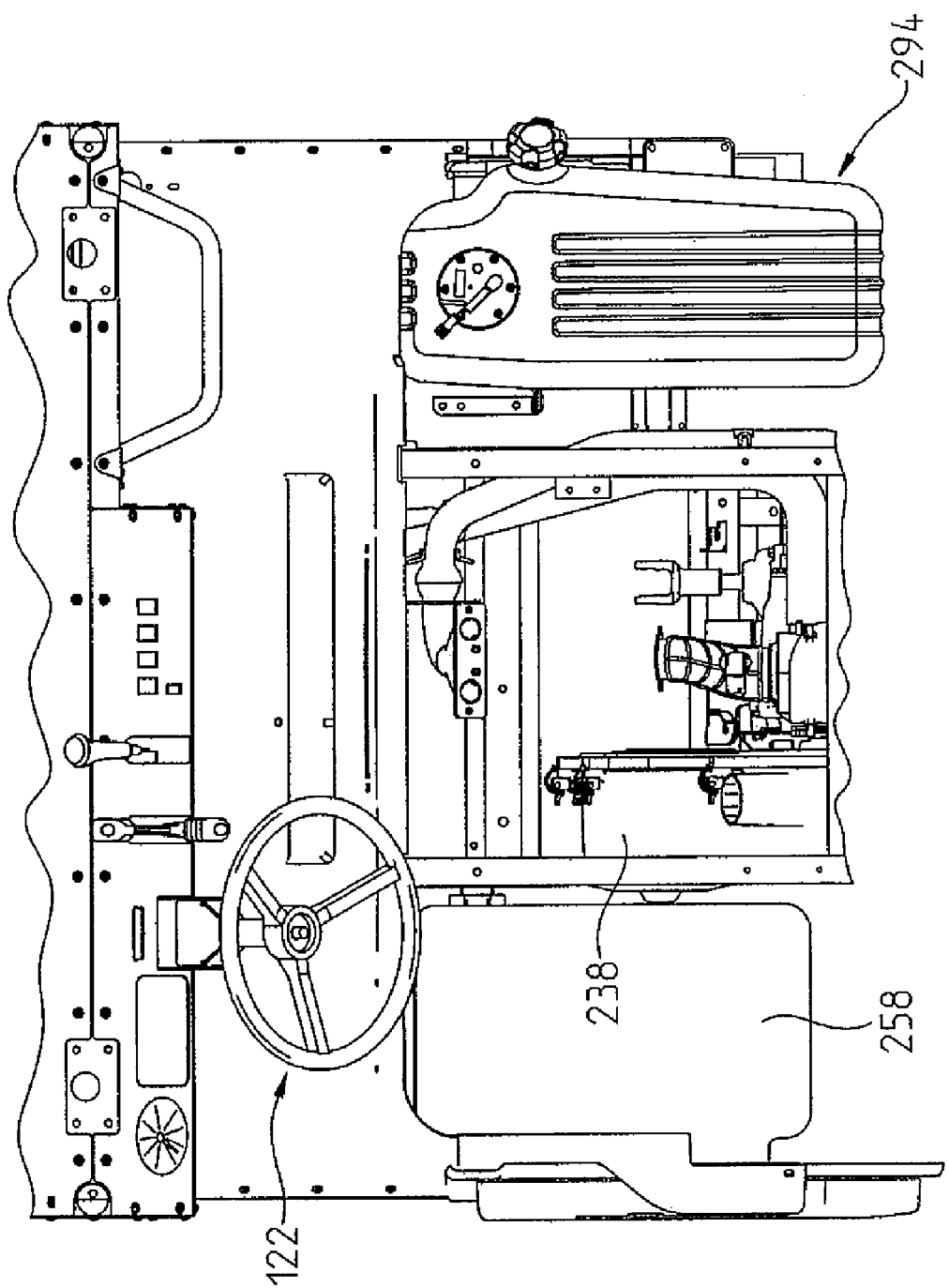
FIG. 21 is a top plan view of the operator area of the vehicle of FIG. 1 showing the seats removed.

Fuel storage is also provided under seating 116 as shown in FIG. 20A. A fourteen gallon fuel tank 294 is positioned under seating 116 on the passenger side of vehicle 100. Frame 104 includes a platform 296 that supports fuel tank 294 and two mirror-image but otherwise identical brackets 298, 299 (shown in FIG. 20B) that couple to flanges 300, 301 (one shown) on fuel tank 294. The driver's side of fuel tank 294 includes a flange 303 that couples to bracket 302. Fuel tank 294 includes a filler cap 306 and an outlet 304 that couples to a fuel line (not shown) extending to the engine. Fuel tank 294 is also shown in FIG. 21. According to an alternative embodiment, a thirteen gallon fuel tank is provided for vehicle 100. The thirteen gallon fuel tank is identical to fuel tank 294 except that the rear wall does not extend as far back as rear wall 308 of fuel tank 294.

Figure 22:
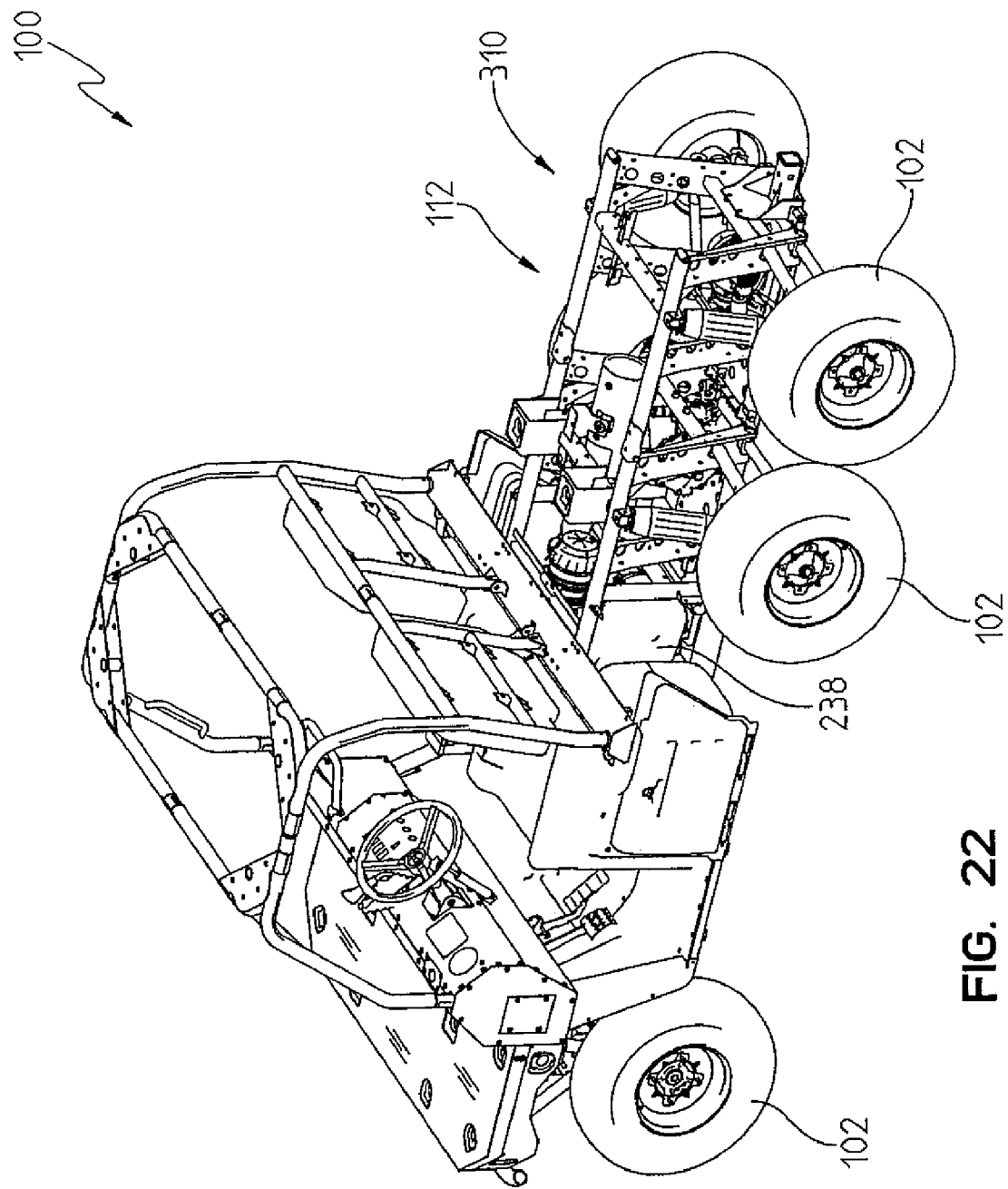
FIG. 22 is a view similar to FIG. 1 showing the rear platform removed.
Figure 23:
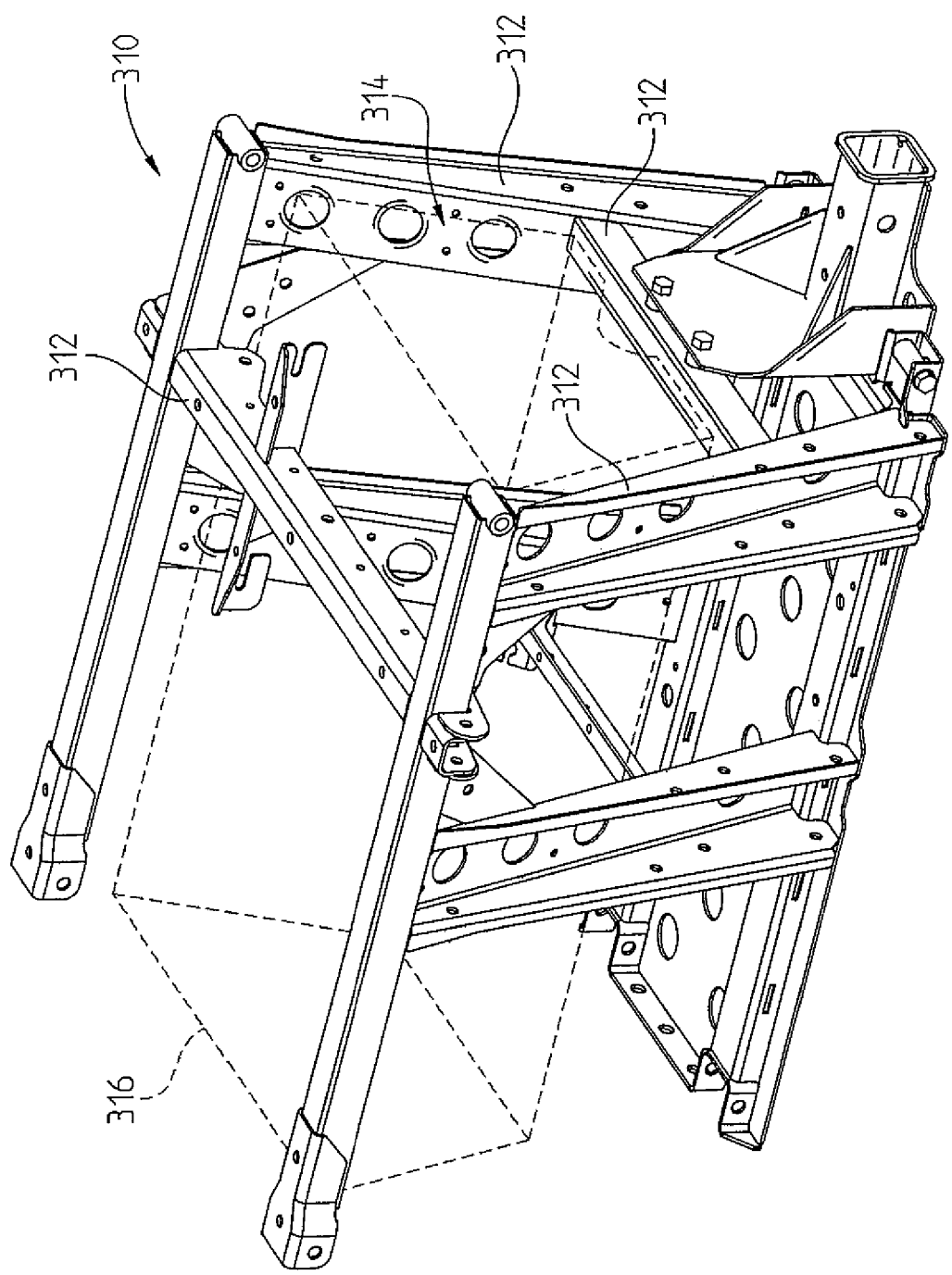
FIG. 23 is a perspective view of a base frame of a modular sub-section of the vehicle of FIG. 1.
Figure 24:
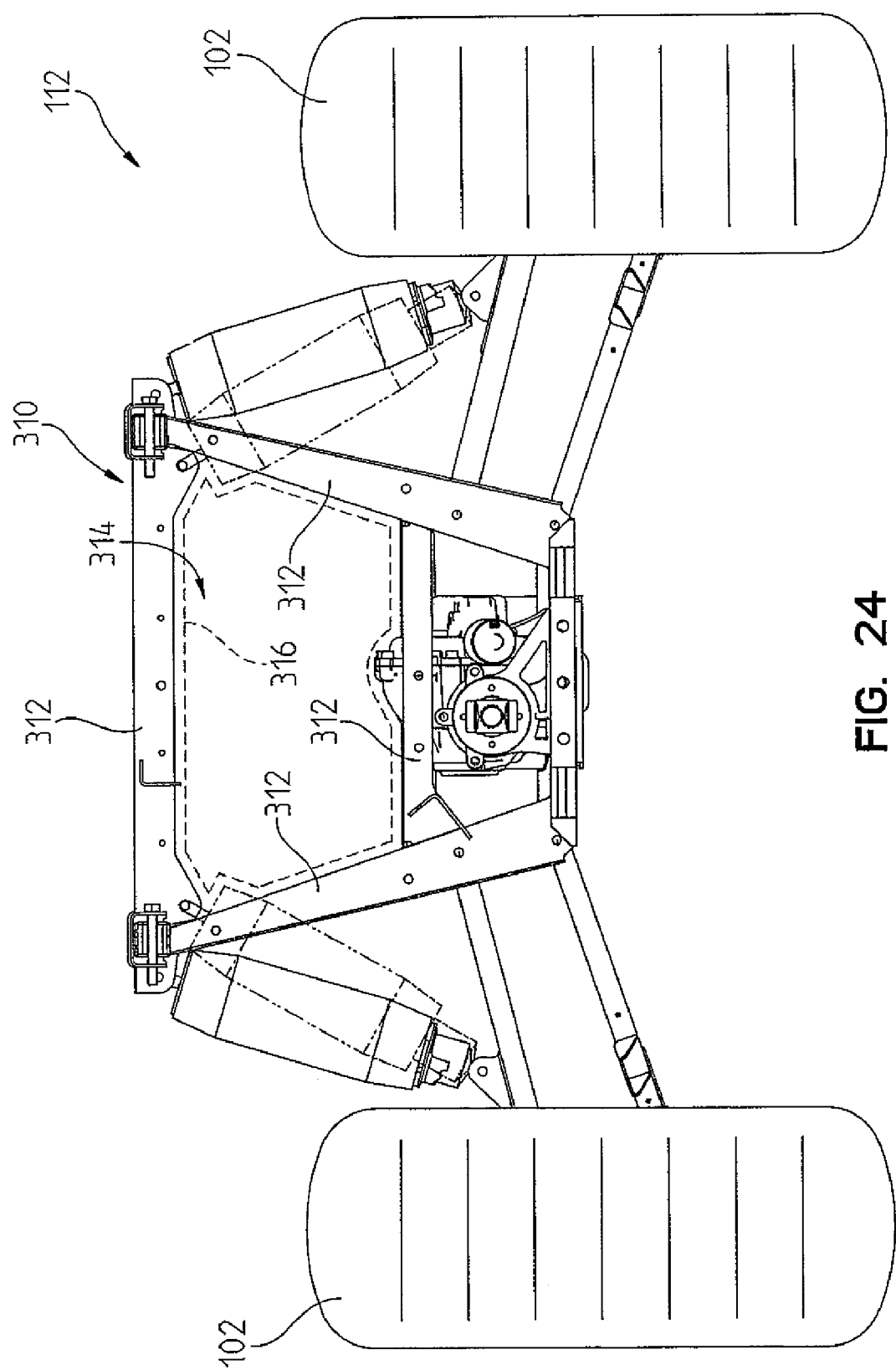
FIG. 24 is an enlarged rear view of the modular sub-section of the vehicle of FIG. 1.

Additional storage is provided in a base frame 310 of modular sub-section 112. As shown in FIGS. 22-24, base frame 310 includes a plurality of frame members 312 that cooperate to define a trapezoidal interior region 314. A storage compartment 316 is provided (shown in phantom) in interior region 314 to hold various items, such as tools, weapons, ammo, spare parts, and other items. The exterior of storage compartment 316 is contoured to match the inner perimeter of interior region 314. According to one embodiment, a rearward portion of compartment 316 is provided with a sealed door similar to door 254 discussed above. According to other embodiment, storage compartment 316 rides on tracks similar to tracks 264 discussed above. According to an alternative embodiment, compartment 316 is configured as a fuel tank.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle comprising:
   a main frame;
   at least two front ground engaging members supporting the main frame above the ground;
   at least two ground engaging members located rearward of the front ground engaging members and supporting the main frame above the ground;
   an engine supported by the frame;
   an operator area for use by a vehicle operator when the vehicle is in motion;
   a dashboard supported by the main frame and located forward of the operator area, the dashboard having a top surface;
   a cargo platform located forward of the dashboard and at least partially between the front ground engaging members, the cargo platform being normally exposed; and
   one or more hinge members adapted to rotatably couple the cargo platform to the main frame.

2. A vehicle as in claim 1, wherein the upper surface of the cargo platform is located at an elevation that is at least about 10 inches below the elevation of the top surface of the dashboard.

3. A vehicle as in claim 1, wherein the upper surface of the cargo platform is located at an elevation of at most about 38.5 inches above the ground.

4. A vehicle as in claim 1, wherein the cargo platform further includes a front portion and the cargo platform is adapted to pivot about the front portion.

5. A vehicle as in claim 1, further comprising:
   a radiator located below the upper surface; and
   a rectifier located forward of the radiator.

6. A vehicle as in claim 1, further comprising a pair of laterally spaced-apart seating surfaces supported by the main frame and one or more components selected from the group consisting of the transmission, a fuel reservoir, a battery, and a differential, the combustion portion and the one or more components being located at least partially beneath at least one of the pair of seating surfaces.

7. A vehicle as in claim 6, wherein the vehicle has two laterally spaced-apart sides, and at least one of the combustion portion and the one or more components is accessible from at least one of the sides.

8. A vehicle as in claim 7, further comprising a lateral opening in the at least one of the two laterally spaced apart sides, the lateral opening adapted to provide access to the at least one of the combustion portion and the one or more components.

9. A vehicle as in claim 6, wherein at least one of the pair of seating surfaces is pivotably coupled to the main frame and adapted to pivot from a closed position to an open position, and the at least one of the pair of seating surfaces creates a top opening in the open position adapted to provide access to at least one of the combustion portion and the one or more components.

10. A vehicle as in claim 9, wherein the component is a continuously variable transmission.

11. A vehicle as in claim 9, wherein the component is a battery.

12. A vehicle as in claim 9, wherein the component is a fuel reservoir.

13. A vehicle as in claim 9, further comprising a storage area located at least partially below at least one of the pair of seating surfaces.

14. A vehicle as in claim 13, further including a storage compartment located in the storage area.

15. A vehicle as in claim 14, wherein the storage compartment is removable through the top opening.

16. A vehicle as in claim 14, wherein the storage compartment is removable from one of the sides.

17. A vehicle as in claim 16, further comprising a pair of tracks, the storage compartment being slidably coupled to the pair of tracks and adapted to slide at least partially through the lateral opening.

18. A vehicle as in claim 14, wherein the storage compartment is contoured around the combustion portion and the one or more components.

19. A vehicle as in claim 1, further comprising seating supported by the main frame, the seating including a pair of laterally spaced apart seating surfaces and a middle portion located between the pair of seating surfaces.

20. A vehicle as in claim 19, wherein the seating further includes a storage compartment including a plurality of side walls that define an interior space, the storage compartment including a top opening and a lid.

21. A vehicle as in claim 20, wherein the storage compartment is removably coupled to the middle portion.

22. A modular utility vehicle comprising:
   a main frame;
   a plurality of ground engaging members supporting the main frame above the ground;

an engine supported by the main frame;
at least three spaced-apart main couplings supported by the main frame; and
a detachable modular subsection including
  a subframe comprising
  a plurality of frame members cooperating to define an interior storage region,
  at least two ground engagement members supporting the subframe, and
  at least three subsection front couplings supported by the subframe and detachably coupling the subsection to the main couplings of the main frame, the subsection front couplings being spaced apart to substantially prevent the modular subsection from pivoting relative to the main frame when the modular subsection is coupled to the main frame.

23. A modular vehicle as in claim 22, further comprising a storage compartment located in the interior storage region, the storage compartment having a front surface spaced apart from a rear surface.

24. A modular vehicle as in claim 23, further comprising a pair of tracks, wherein the storage compartment is slidably coupled to the pair of tracks and adapted to slide at least partially outside the interior storage region.

25. A modular vehicle as in claim 23, further comprising an access door coupled to the rear surface.

26. A modular vehicle as in claim 22, wherein the interior storage region is adapted to store fuel.

27. A modular vehicle as in claim 26, wherein the interior storage region includes a fuel tank.

* * * * *